United States Patent
Zhou et al.

(10) Patent No.: US 9,831,502 B2
(45) Date of Patent: Nov. 28, 2017

(54) FREE-STANDING ACTIVE MATERIAL/CARBON NANOMATERIAL NETWORK FILM AS LIGHT-WEIGHT AND HIGH-POWER ELECTRODES FOR LITHIUM ION BATTERIES

(71) Applicants: Chongwu Zhou, San Marino, CA (US); Xin Fang, Los Angeles, CA (US); Mingyuan Ge, Los Angeles, CA (US); Jiepeng Rong, Los Angeles, CA (US)

(72) Inventors: Chongwu Zhou, San Marino, CA (US); Xin Fang, Los Angeles, CA (US); Mingyuan Ge, Los Angeles, CA (US); Jiepeng Rong, Los Angeles, CA (US)

(73) Assignee: University of Southern California, Los Angeles, CA (US)

(*) Notice: Subject to any disclaimer, the term of this patent is extended or adjusted under 35 U.S.C. 154(b) by 101 days.

(21) Appl. No.: 14/697,511

(22) Filed: Apr. 27, 2015

(65) Prior Publication Data

US 2015/0380738 A1    Dec. 31, 2015

Related U.S. Application Data

(60) Provisional application No. 62/019,056, filed on Jun. 30, 2014.

(51) Int. Cl.
*H01M 4/04* (2006.01)
*H01M 4/131* (2010.01)
(Continued)

(52) U.S. Cl.
CPC ......... *H01M 4/621* (2013.01); *H01M 4/0404* (2013.01); *H01M 4/625* (2013.01);
(Continued)

(58) Field of Classification Search
CPC ...... H01M 4/131; H01M 4/505; H01M 4/525; H01M 4/621; H01M 4/625; H01M 4/663; H01M 4/75; H01M 2004/028; H01M 10/0525; H01M 2220/20; H01M 2220/30; Y02E 60/122
See application file for complete search history.

(56) References Cited

U.S. PATENT DOCUMENTS 3,558,360 A    1/1971   Sverdrup
2010/0086853 A1  4/2010  Venkatachalam
(Continued)

FOREIGN PATENT DOCUMENTS

WO    WO2013130690 A9   11/2014

OTHER PUBLICATIONS

Amine et al., Preparation and Electrochemical Investigation of Limn2-Xmexo4 (Me : Ni, Fe, and X=0.5, 1) Cathode Materials for Secondary Lithium Batteries. J. Power Sources, 1997, 68:604-608.
(Continued)

*Primary Examiner* — Brittany Raymond
(74) *Attorney, Agent, or Firm* — Fish & Richardson P.C.

(57) ABSTRACT

An electrode includes a first free-standing carbon network, an active material deposited above the first free-standing carbon network, and a second free-standing carbon network covering the active material. The first and second carbon networks are a binder, a conductive additive and a current collector to the electrode.

21 Claims, 38 Drawing Sheets

(51) Int. Cl.
| | |
|---|---|
| H01M 4/1391 | (2010.01) |
| H01M 4/505 | (2010.01) |
| H01M 4/525 | (2010.01) |
| H01M 4/62 | (2006.01) |
| H01M 4/66 | (2006.01) |
| H01M 4/75 | (2006.01) |
| H01M 10/0525 | (2010.01) |
| H01M 4/02 | (2006.01) |

(52) U.S. Cl.
CPC ............ *H01M 4/663* (2013.01); *H01M 4/75* (2013.01); *H01M 10/0525* (2013.01); H01M 4/131 (2013.01); H01M 4/1391 (2013.01); H01M 4/505 (2013.01); H01M 4/525 (2013.01); H01M 2004/028 (2013.01); H01M 2220/20 (2013.01); H01M 2220/30 (2013.01); Y02E 60/122 (2013.01)

(56) References Cited

U.S. PATENT DOCUMENTS

| | | | | |
|---|---|---|---|---|
| 2010/0178543 | A1* | 7/2010 | Gruner | B82Y 30/00 429/121 |
| 2011/0111299 | A1 | 5/2011 | Liu | |
| 2012/0164499 | A1* | 6/2012 | Chiang | H01M 8/188 429/81 |
| 2012/0276434 | A1 | 11/2012 | Gaikwad | |
| 2013/0089790 | A1* | 4/2013 | Byon | H01G 11/36 429/231.8 |

OTHER PUBLICATIONS

Armand and Tarascon, Building Better Batteries. Nature, 2008, 451:652-657.
Chen et al., Mwcnt/V2o5 Core/Shell Sponge for High Areal Capacity and Power Density Li-Ion Cathodes. Acs Nano, 2012, 6:7948-7955.
Cheng et al., Folding Paper-Based Lithium-Ion Batteries for Higher Areal Energy Densities. Nano Lett., 2013, 13:4969-4974.
Delacourt et al., Toward Understanding of Electrical Limitations (Electronic, Ionic) in Limpo4 (M=Fe, Mn) Electrode Materials. J. Electrochem. Soc,. 2005, 152:A913-A921.
Evanoff et al., Ultra Strong Silicon-Coated Carbon Nanotube Nonwoven Fabric as a Multifunctional Lithium-Ion Battery Anode. Acs Nano, 2012, 6:9837-9845.
Fang et al., Electrochemical Properties of Nano- and Micro-Sized Lini0.5mn1.5o4 Synthesized via Thermal Decomposition of a Ternary Eutectic Li—Ni—Mn Acetate. Electrochim. Acta, 2010, 55:832-837.
Fang et al., Graphene-Oxide-Coated Lini0.5mn1.5o4 as High Voltage Cathode for Lithium Ion Batteries with High Energy Density and Long Cycle Life. J. Mater. Chem., A 2013, 1:4083-4088.
Fang et al., Study of Lini0.5mn1.5o4 Synthesized via a Chloride-Ammonia Co-Precipitation Method: Electrochemical Performance, Diffusion Coefficient and Capacity Loss Mechanism. Electrochim. Acta, 2009, 54:7471-7475.
Fang et al., Ultrathin Surface Modification by Atomic Layer Deposition on High Voltage Cathode Lini0.5mn1.5o4 for Lithium Ion Batteries. Energy Technology, 2014, 2:159-165.
Fang et al., Free-Standing LiNi0.5mn1.5O4/Carbon Nanofiber Network Film as Lightweight and High-Power Cathode for Lithium Ion Batteries. Acs Nano, 2014, 8:4876-4882.
Feng et al., Synthesis of Lini0.5mn1.5o4 by Solid-State Reaction with Improved Electrochemical Performance. J. Alloys Compd., 2011, 509:3623-3626.
Goodenough and Kim, Challenges for Rechargeable Batteries. J. Power Sources, 2011, 196:6688-6694.
Goodenough and Kim, Challenges for Rechargeable Li Batteries. Chem. Mater., 2010, 22:587-603.

'Pyrografproducts.com' [online]. "Pyrograf-III Carbon Nanofiber," 2011, [retrieved on Apr. 29, 2015]. Retrieved from the Internet: URL: http://pyrografproducts.com/Merchant5/merchant.mvc?Screen=cp_nanofiber. 6 pages.
Hu et al., Highly conductive paper for energy-storage devices. Proc. Natl. Acad. Sci. U. S. A., 2009, 106:21490-21494.
Jia et al., Direct Growth of Flexible Limn2o4/Cnt 9669-9671. Lithium-Ion Cathodes. Chem. Commun. 2011, 47, 9669-9671.
Jia et al., High-Performance Flexible Lithium-Ion Electrodes Based on Robust Network Architecture. Energy Environ. Sci., 2012, 5:6845-6849.
Kim et al., Comparative Study of LiNi0.5Mn1.5O4-δ and LiNi0.5Mn1.5O4 Cathodes Having Two Crystallographic Structures: and P4332. Chem. Mater., 2004, 16:906-914.
Kim et al., The Current Move of Lithium Ion Batteries Towards the Next Phase. Adv. Energy Mater, 2012, 2:860-872.
Kim et al., Molten Salt Synthesis of Lini0.5mn1.5o4 Spinel for 5 V Class Cathode Material of Li-Ion Secondary Battery. Electrochim. Acta, 2004, 49:219-227.
Koo et al., Bendable inorganic thin-film battery for fully flexible electronic systems. Nano Left., 2012, 12:4810-4816.
Lee et al., Wearable textile battery rechargeable by solar energy. Nano Lett., 2013, 13:5753-5761.
Liu and Manthiram, Understanding the Improvement in the Electrochemical Properties of Surface Modified 5 V Limn1.42ni0.42co0.16o4 Spinel Cathodes in Lithium-Ion Cells. Chem. Mater., 2009, 21:1695-1707.
Liu et al., Cathode Materials for Lithium Ion Batteries Prepared by Sol-Gel Methods. J. Solid State Electrochem., 2004, 8:450-466.
Liu et al., Hierarchical Silicon Nanowires-Carbon Textiles Matrix as a Binder-Free Anode for High-Performance Advanced Lithium-Ion Batteries. Sci. Rep-Uk, 2013, 3:1622 (7 pages).
Liu et al., Hierarchical Three-Dimensional Znco2o4 Nanowire Arrays/Carbon Cloth Anodes for a Novel Class of High-Performance Flexible Lithium-Ion Batteries. Nano Left., 2012, 12:3005-3011.
Liu et al., Spinel Materials for High-Voltage Cathodes in Li-Ion Batteries. Rsc Adv., 2014, 4:154-167.
Luo et al., Binder-Free Licoo2/Carbon Nanotube Cathodes for High-Performance Lithium Ion Batteries. Adv. Mater., 2012, 24:2294-2298.
Park et al., Flexible High-Energy Li-Ion Batteries with Fast-Charging Capability. Nano Left., 2014, 14:4083-4089.
Sui et al., Dielectric Properties and Conductivity of Carbon Nanofiber/Semi-Crystalline Polymer Composites. Acta Mater., 2008, 56:2381-2388.
Sun et al., Sulfur Nanocrystals Confined in Carbon Nanotube Network as a Binder-Free Electrode for High-Performance Lithium Sulfur Batteries. Nano Lett., 2014, 14:4044-4049.
Tarascon and Armand, Issues and Challenges Facing Rechargeable Lithium Batteries., Nature, 2001, 414:359-367.
Trionfi et al., Direct Measurement of the Percolation Probability in Carbon Nanofiber-Polyimide Nanocomposites. Phys. Rev. Lett. 2009, 102:116601-1-116601-4.
Wang et al., Super-Aligned Carbon Nanotube Films as Current Collectors for Lightweight and Flexible Lithium Ion Batteries. Adv. Funct. Mater., 2013, 23:846-853.
Wu et al., Depolarized and Fully Active Cathode Based on Li(Ni0.5Co0.2Mn0.3)O2 Embedded in Carbon Nanotube Network for Advanced Batteries. Nano Lett., 2014, 14:4700-4706.
Xu et al., Improvement of electrochemical properties of LiNi0.5Mn1.5O4 spinel prepared by radiated polymer gel method. Electrochim. Acta, 2006, 51:4352-4357.
Yoon et al., Failure mechanisms of LiNi0.5Mn1.5O4 electrode at elevated temperature. J. Power Sources, 2012, 215:312-316.
Zhang et al., Mass production of aligned carbon nanotube arrays by fluidized bed catalytic chemical vapor deposition. Carbon, 2010, 48:1196-1209.
Zhong et al., Effects of Al Substitution for Ni and Mn on the Electrochemical Properties of Lini0.5mn1.5o4. Electrochim. Acta, 2011, 56:6554-6561.
Zhong et al., Synthesis and Electrochemistry of Linixmn2-Xo4. J. Electrochem. Soc., 1997, 144:205-213.

(56) References Cited

OTHER PUBLICATIONS

Zhou et al., Progress in flexible lithium batteries and future prospects. Energy Environ. Sci., 2014, 7: 1307-1338.
Zhu et al., Tin Anode for Sodium-Ion Batteries Using Natural Wood Fiber as a Mechanical Buffer and Electrolyte Reservoir. Nano Lett., 2013, 13:3093-3100.
Braun et al., "High power rechargeable batteries", Current Opinion in Solid State and Materials Science (2012), http://dx.doi.org/10.1016/jcossms.2012.05.002, Emerging Opportunities in Energy Storage, 14 pages, Aug. 1, 2012.
International Application No. PCT/US15/27845, Notification of Transmittal of the International Search Report and the Written Opinion of the Internatioanl Searching Authority, dated Aug. 5, 2015, 14 pages.

\* cited by examiner

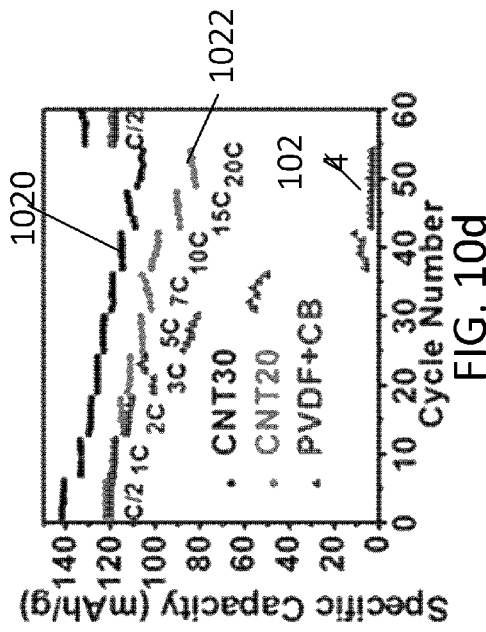
FIG. 10d
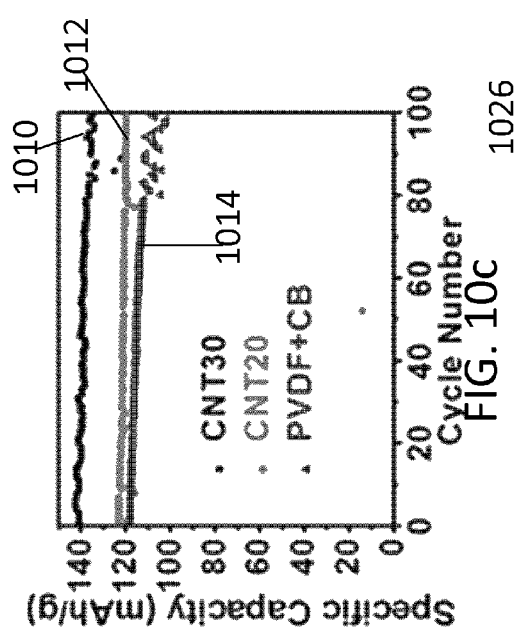
FIG. 10c
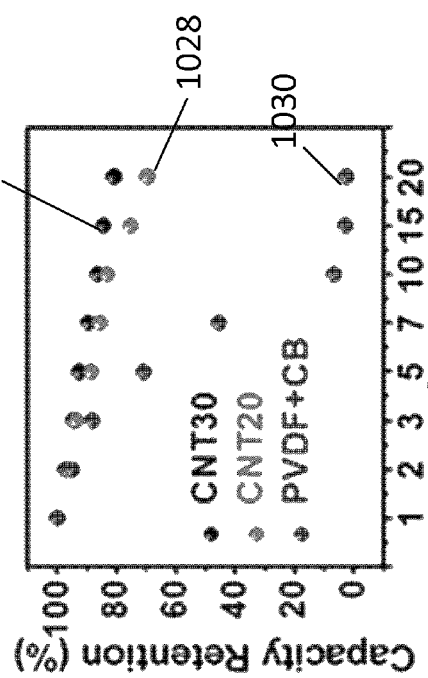
FIG. 10f
FIG. 10e

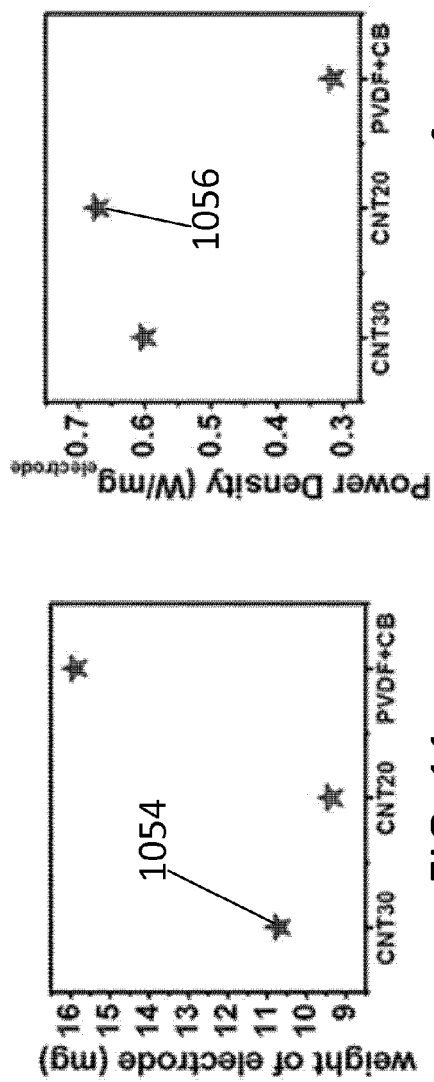
FIG. 11f
FIG. 11e
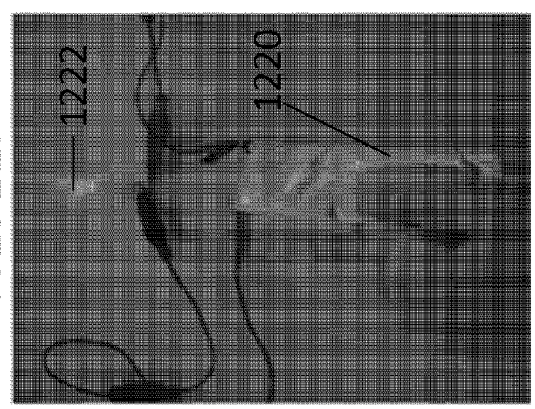
FIG. 12c
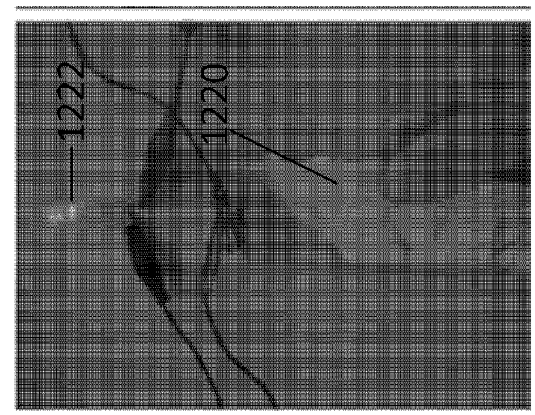
FIG. 12b

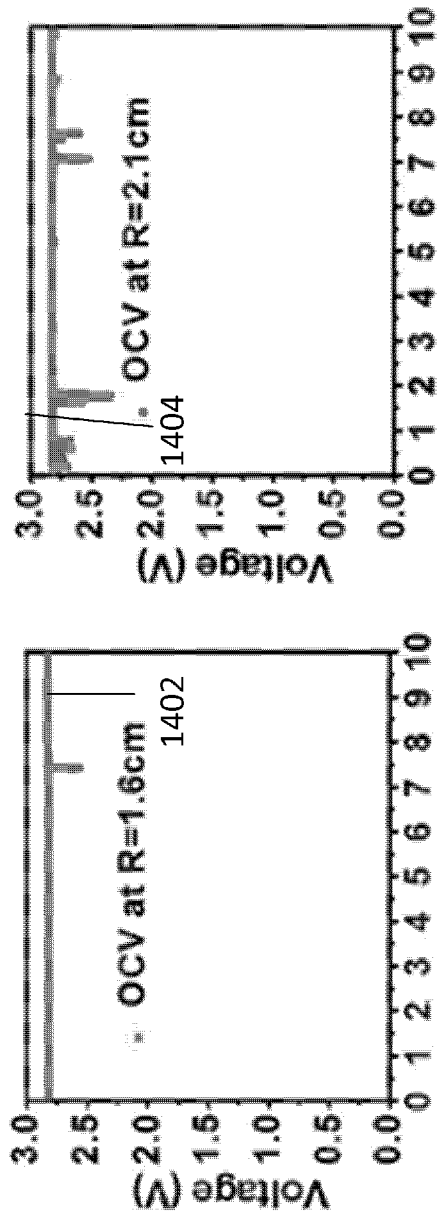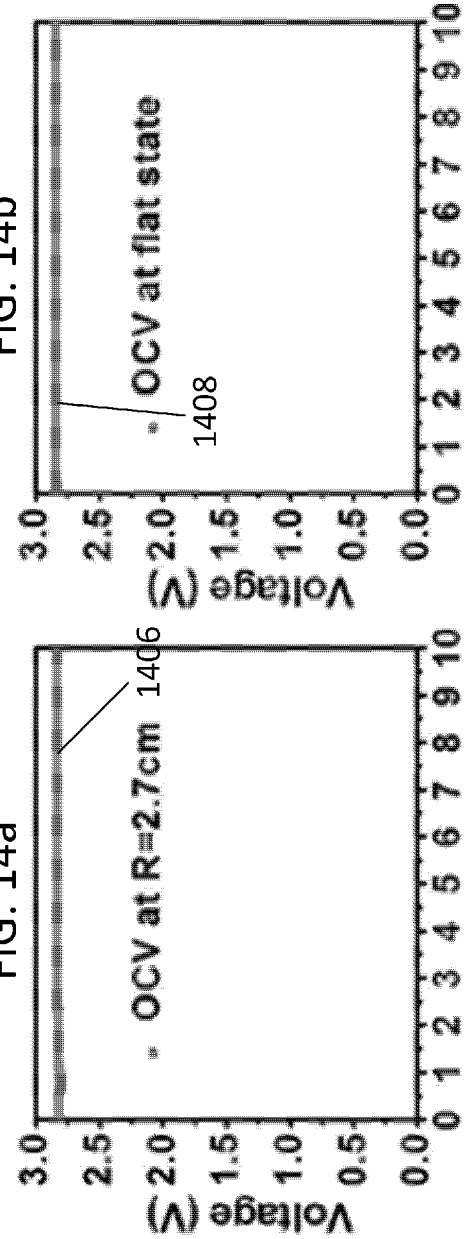
FIG. 14a — OCV at R=1.6cm (1402)
FIG. 14b — OCV at R=2.1cm (1404)
FIG. 14c — OCV at R=2.7cm (1406)
FIG. 14d — OCV at flat state (1408)

FREE-STANDING ACTIVE MATERIAL/CARBON NANOMATERIAL NETWORK FILM AS LIGHT-WEIGHT AND HIGH-POWER ELECTRODES FOR LITHIUM ION BATTERIES

CROSS-REFERENCE TO RELATED APPLICATION

This application claims priority to U.S. Application Ser. No. 62/019,056, filed on Jun. 30, 2014, which is incorporated herein by reference.

FIELD OF INVENTION

This disclosure relates to light-weight and high-power cathode for lithium ion batteries.

BACKGROUND

The lithium ion battery field has progressed since Sony commercialized the first lithium ion battery in the early 1990s. Lithium ion batteries are now widely used as power sources and energy storage devices in our daily life, especially in portable electronics. Despite the great success of lithium ion batteries up to now, new generation electronic products, such as ultra-thin and ultra-light devices, place ever higher demands on battery performance. In addition, the development of electric vehicles, hybrid electric vehicles and plug-in hybrid electric vehicles also benefits from further enhancement of battery performance. Innovations in battery technology may fulfill the ever-increasing demand for higher power/energy density, better rate capabilities and longer cycle life. Longer cycle life can allow a battery to withstand more charge/discharge cycles.

The energy density of the batteries can be expressed as $\int_0^Q V(q)dq/wt$, where q is the state of electronic charge, V(q) is the voltage at the state of electronic charge q, Q is the total amount of electronic charge transported during battery cycling, and wt is the weight of electrode. Improving energy density of the batteries can thus be accomplished in three ways: increasing voltage, increasing capacity or reducing weight. Using a high voltage cathode is an effective way to increase the voltage of lithium ion batteries, since the working voltage of an anode has almost reached the working potential of lithium metal. A lithium ion battery typically works at voltages below 4.2V. A cathode which can work above 4.3V can be considered as high voltage cathode.

In a three electrode electrochemical cell (i.e., counter electrode, reference electrode, and working electrode), the counter electrode and the reference electrode may be different. The reference electrode establishes the electrical potential against which other potentials can be measured. The counter electrode is an electrode used in a reaction in which current is expected to flow. When lithium metal functions as both a counter electrode and a reference electrode, the potential of lithium metal is taken as 0. Currently graphite is used as anode and it works at 0.2V vs. Li metal.

By substituting part of Mn with Ni in the spinel $LiMn_2O_4$ structure, the working redox couple becomes $Ni^{2+}/Ni^{3+}$ and $Ni^{3+}/Ni^{4+}$ instead of $Mn^{3+}/Mn^{4+}$. The double redox couple from Ni has increased the working voltage of $LiNi_{0.5}Mn_{1.5}O_4$ to 4.7V due to the increased binding energy of Ni 3d electrons, which was reported to be 0.5 eV higher than Mn 3d $e_g$ electrons. Among the high voltage cathode materials, $LiNi_{0.5}Mn_{1.5}O_4$ is considered as one of the most promising candidates because this material's redox chemistries involve double redox couples, $Ni^{2+}/Ni^{3+}$ and $Ni^{3+}/Ni^{4+}$, where relatively high capacity can be obtained. One redox couple means one electron can be transported per ion, so double redox couples allow two electrons to be transported per Ni ion, leading to a higher capacity. Comparing with some other materials with only one redox couple, materials using double redox couples can have a higher capacity. With a high working voltage of 4.7 V and theoretical capacity of 146.7 mAh/g, $LiNi_{0.5}Mn_{1.5}O_4$ can provide 20% and 30% higher energy density than traditional cathode materials $LiCoO_2$ and $LiFePO_4$, respectively.

Reducing the weight of the batteries is another way to enhance the energy density. Battery electrodes can be designed to replace or even eliminate the use of binders or current collectors in conventional battery electrode structure. Replacing binders or current collectors can involve using other materials which can function as binder or current collector in the battery such that traditional binders and current collectors do not need to be included in the battery. When traditional binders or current collects are no longer required, they can be eliminated from the battery. For example, when the structure of the electrode obviates the use of separate binders or current collectors.

These designs have stimulated a new trend of developing high energy density lithium ion batteries through light-weight electrodes. In conventional systems, the active materials in the electrodes are first mixed with a conductive additive and binders, and then coated onto metal current collectors. While those additives, binders and current collectors do not contribute to battery capacity, they can form a substantial portion of the total weight of the batteries. Even though carbon fiber or carbon cloth can replace current collectors to reduce the weight of the battery and enhance flexibility, the weight from conductive additive and binder still contributes to the weight of the battery. Carbon cloth is a cloth made from carbon fiber, and is not a traditional fabric.

Furthermore, growth of active material onto the carbon fiber or carbon cloth deviates from the commercial practice of active material synthesis and may be challenging to scale up.

SUMMARY

The methods and compositions disclosed in this application can improve the energy density of lithium ion batteries by providing a novel design for the electrode structure and the use of materials suitable for fabricating high voltage cathodes. In general, the structural designs disclosed herein can be used in both cathode and anode.

The methods, compositions and devices disclosed herein integrate both material optimization and electrode design to achieve multiple enhancements and functionalities simultaneously. Additionally, the methods described herein can be scaled up for industrial production.

Light-weight and high-power active material/carbon nanomaterial network electrodes, such as $LiNi_{0.5}Mn_{1.5}O_4$/carbon nanofiber (CNF) network electrodes can be developed as high voltage cathode for lithium ion batteries. Network electrodes are electrodes that contain materials which can from a network grid. High voltage cathodes are cathodes that can work above, for example, 4.3 V. The carbon nanomaterial can include CNF or carbon nanotubes (CNT). The $LiNi_{0.5}Mn_{1.5}O_4$/CNF network electrodes are free-standing and can be used as cathode without using any binder, carbon black or metal current collector, and hence the total weight of the electrode is highly reduced while keeping the same areal loading of active materials. Areal loading is the weight of the active material per unit area of the electrode. The CNF or CNT in the network electrode become intertwined with one another so the materials do not fall apart even when no supporting substrates are used. Conventional systems are not "free-standing" because active materials which are in powder form need to be glued onto a current collector to form an electrode. In the absence of binders and current collectors, the powders is not "free-standing".

Compared with conventional electrodes, the $LiNi_{0.5}Mn_{1.5}O_4$/CNF network electrodes can yield up to 55% reduction in total weight and 2.2 times enhancement in the weight percentage of active material in the whole electrode. Moreover, the $LiNi_{0.5}Mn_{1.5}O_4$/CNF network electrodes showed excellent current rate capability in the large current test up to 20 C (1 C=140 mAh/g), when conventional electrodes showed almost no capacity at the same condition. Further analysis of polarization resistance confirmed the favorable conductivity from CNF network compared with conventional electrode structure. Polarization is a deviation of the electrochemical process from equilibrium due to an electric current passing through the battery. Polarization resistance is the cause of potential drop due to high resistivity. By reducing weight, increasing working voltage (i.e., the voltage a battery can provide) and improving large current rate capability (e.g., the ability to be used at rates up to 20 C) simultaneously, the $LiNi_{0.5}Mn_{1.5}O_4$/CNF electrode structure can highly enhance the energy/power density of lithium ion batteries, and thus holds great potential for use in ultra-thin, ultra-light electronic devices as well as electric vehicles and hybrid electric vehicles. The working voltage can be increased because of LNMO, which can be used as a high voltage cathode.

A free-standing $LiNi_{0.5}Mn_{1.5}O_4$/CNF electrode without using any other conductive additives, polymer binders or metal current collectors is described. By replacing some (e.g., all) of the inactive materials in the conventional electrodes by CNFs, which are light-weight and conductive, the energy/power density of the battery can be highly enhanced. Using this approach, the weight of the electrodes is reduced while simultaneously increasing the working voltage of the electrodes to result in a complementary enhancement of the energy/power density of the electrode. The electrodes include $LiNi_{0.5}Mn_{1.5}O_4$ particles synthesized via a highly scalable solid state reaction method, and commercially available, mass produced CNFs. The $LiNi_{0.5}Mn_{1.5}O_4$ particles are distributed in a free-standing CNF network, allowing direct access to electrolytes and also facilitates electron transfer. The CNFs are conductive and thus good for electron transport. The electrolyte can include lithium salt such as $LiPF_6$, which is dissolved in solvents such as ethylene carbonate and dimethyl carbonate. The CNF network is essentially a two-dimensional/planar structure. The gaps (e.g., grid spacing) in the CNF network allow electrolytes to penetrate the electrodes to contact the LNMO such that not only the LNMO particles distributed on the top and bottom surfaces of the CNF network is in contact with the electrolytes.

The design of the electrode structures disclosed herein allows the following benefits to be achieved: 1) the carbon nanomaterials (CNFs or carbon nanotubes, CNT) can act as binder, conductive additive and current collector simultaneously, and no other electrochemically inactive additives are needed in the electrodes, highly reducing the total weight of the electrodes; 2) in contrast to traditional binders, which are usually insulating, the conductivity of the electrodes is greatly enhanced due to the good conductivity of the carbon nanomaterials; 3) the CNF network is continuous and porous, facilitating electrolyte infiltration in addition to electron transfer, allowing the $LiNi_{0.5}Mn_{1.5}O_4$ particles to access Li ions in the electrolyte more efficiently (LNMO needs to access the Li ions for the battery to cycle and deliver capacity); 4) the energy density is enhanced by a combined effect of simultaneously increasing voltage provided by the active material $LiNi_{0.5}Mn_{1.5}O_4$ which has a high working voltage and reducing the weight of the electrode by the use of light-weight CNF network. The capacity of the battery is not compromised because $LiNi_{0.5}Mn_{1.5}O_4$ offers similar capacity compared with other traditional cathode materials such as $LiCoO_2$. The capacity refers to the total charge a battery can provide. $LiCoO_2$ can also be used in the network electrode formed by CNFs or CNT, instead of LNMO.

Free-standing $LiNi_{0.5}Mn_{1.5}O_4$/CNF electrode without using any other conductive additives, polymer binders or metal current collectors reduces the weight and increase the working voltage of the electrode simultaneously, resulting in a complementary enhancement of the energy/power density of the electrode. In addition, the surface of the electrodes is covered by an extra thin layer of CNF network, distinct from the CNF network into which LNMO particles are distributed, to ensure that the particles are trapped inside the electrodes instead of falling out from the surface.

The methods and apparatus disclosed herein allows active materials to be separately prepared from the carbon nanofiber network. In other words, the method is not restricted to the use of active materials that can only be grown onto substrate, but can accommodate a variety of active materials. The production of active materials can also be scaled up.

In addition, the surface of the electrode can be covered by a thin layer of carbon nanofiber film, which prevents the loss of active materials that fall out of the electrodes. Free-standing $LiNi_{0.5}Mn_{1.5}O_4$/CNF network electrodes were fabricated using vacuum filtration, which can be scaled up through roll-to-roll process. Roll-to-roll process can be used in industry to increase high throughput and continuous operation compared to vacuum filtration.

For the electrodes with weight ratio of $LiNi_{0.5}Mn_{1.5}O_4$: CNF=1:1 (denoted by CNF1/2), the total weight of an electrode is reduced by 25% compared with a conventional one, however, the performance is superior, especially at large current rate. After charging/discharging at 3 C and 5 C (1 C=140 mA/g) for 100 cycles, the $LiNi_{0.5}Mn_{1.5}O_4$/CNF network electrodes can still deliver 116.4 and 111.5 mAh/g capacity, while the conventional electrodes do not maintain the high voltage plateau.

When discharged at 20 C, the $LiNi_{0.5}Mn_{1.5}O_4$/CNF network electrodes has a capacity of 99.3 mAh/g, while the capacity of conventional electrodes decreases to almost zero. In addition, free-standing electrodes can still be obtained when increasing the weight ratio of $LiNi_{0.5}Mn_{1.5}O_4$:CNF to 3:1 and even 5:1 (denoted by CNF1/4 and CNF1/6 respectively). The total weight of an electrode is then reduced by 50% and 55% (for a constant weight of active material), respectively, and the electrochemical performance is superior to that of conventional electrodes.

In one aspect, an electrode includes a first carbon network, a layer deposited above the first carbon network, the layer including an active material; and a second carbon network covering the layer. The first and second carbon networks are a binder, a conductive additive and a current collector to the electrode.

Implementations can include one or more of the following features. The active material can include $LiNi_{0.5}Mn_{1.5}O_4$, and the first and second carbon networks can be continuous and porous. The first and second carbon networks can include carbon nanofibers. The layer can include carbon nanofibers into which $LiNi_{0.5}Mn_{1.5}O_4$ is embedded, and the electrode can contain only carbon nanofibers and $LiNi_{0.5}Mn_{1.5}O_4$. The carbon nanofibers in the layer can be a binder, a conductive additive and a current collector to the electrode. The first and second carbon networks can include carbon nanotubes, and the electrode is flexible. The electrode can provide a specific capacity of not less than 65 mAh/g at a current rate of 20 C. A polarization resistance of the electrode can be less than 0.2 ohm/g. A weight percentage of the active material to the weight of the electrode is at least 0.45%. The electrode can deliver a capacity of more than 110 mAh/g after 100 charging and discharging at 5 C. A lithium-ion battery can include the electrode.

In one aspect, a method of forming an electrode, the method includes adding a carbon material to a filtration system to obtain a first layer of a carbon network by vacuum filtration, and forming a composite film by adding an active material to the first layer of the carbon network by vacuum filtration. The method includes adding a second layer of the carbon network on top of the active material by vacuum filtration.

In one aspect, a method of forming an electrode, the method includes vacuum filtering a carbon material to obtain a first layer of a carbon network, and vacuum filtering a mixture that includes an active material and the carbon material to form a composite film above the first layer of the carbon network. The method includes vacuum filtering the carbon material to obtain a second layer of the carbon network above the composite film.

Implementations include one or more of the following features. The carbon network includes a carbon nanomaterial. The carbon nanomaterial includes carbon nanofibers. The carbon nanomaterial can include carbon nanotubes. A lithium-ion battery having a flexible electrode can be formed using the method. The active material can include $LiNi_{0.5}Mn_{1.5}O_4$. A battery can be formed using the method, where the electrode provides a specific capacity of not less than 65 mAh/g at a current rate of 20 C. A battery can be formed using the method, where the electrode can deliver a capacity of more than 110 mAh/g after 100 charging and discharging at 5 C. A battery can be formed using the method, where a weight percentage of the active material to the weight of the electrode is at least 0.45%.

In one aspect, an electrode includes a first carbon network having carbon nanotubes, a layer deposited above the first carbon network, the layer including an active material. The electrode includes a second carbon network covering the layer, the second carbon network having carbon nanotubes. The first and second carbon networks are a binder, a conductive additive and a current collector to the electrode, and the electrode is flexible.

Implementations can include one or more of the following features. The active material can include $LiNi_{0.5}Mn_{1.5}O_4$, and the layer can include carbon nanotubes into which $LiNi_{0.5}Mn_{1.5}O_4$ is embedded, particles of $LiNi_{0.5}Mn_{1.5}O_4$ being connected by the carbon nanotubes. For a current density of 20 C, the electrode can provide at least 60% of its capacity at 1 C. The specific capacity can be not less than 80 mAh/g at a current rate of 20 C. A polarization resistance of the electrode can be less than 0.4 ohm/g. The electrode can deliver a capacity of more than 110 mAh/g after 100 charging and discharging at 5 C. A lithium-ion battery can include the electrode. An open circuit voltage of a battery at a bending radius of 1.6 cm or greater can be not more than 0.03V lower than a flat state open circuit voltage of the battery. The carbon nanotubes in the layer can be a binder, a conductive additive and a current collector to the electrode. The electrode can include carbon nanotubes and $LiNi_{0.5}Mn_{1.5}O_4$. The first and second carbon networks can include carbon nanotubes, and the active material can include Si or S.

In one aspect, a method of forming an electrode includes depositing a carbon material using a first solution of carbon nanotubes to obtain a first layer of a carbon network. The method includes depositing an active material and the carbon material using a solution mixture to form a composite film above the first layer of the carbon network. The method includes depositing the carbon material using a second solution that includes the carbon nanotubes to obtain a second layer of the carbon network above the composite film. The first layer of the carbon network, the second layer of the carbon network are a binder, a conductive additive and a current collector to the electrode.

Implementations can include one or more of the following features. A lithium-ion battery having a flexible electrode can be formed using the method. The active material can include $LiNi_{0.5}Mn_{1.5}O_4$. The electrode can include carbon nanotubes and $LiNi_{0.5}Mn_{1.5}O_4$.

The method can include providing a binder, a conductive additive and a current collector to the electrode by using carbon nanotubes as the carbon material. The first and second carbon networks can include carbon nanotubes, and the active material can include Si or S.

BRIEF DESCRIPTION OF THE DRAWINGS

FIG. 1b is a schematic of a bottom CNF thin layer in a network electrode formed using the apparatus shown in FIG. 1a.

FIG. 10c shows specific capacity vs. cycle number over 100 cycles for CNT30, CNT20 and conventional electrodes.

FIG. 10d shows specific capacity of CNT30, CNT20 and conventional electrodes at different current densities.

FIG. 10e shows capacity retention at different current densities with respect to the capacity at 1 C for CNT30, CNT20 and conventional electrodes.

FIG. 10f shows polarization resistance calculated for CNT30, CNT20 and conventional electrodes at different depth of discharge.

FIG. 11e shows total weight of CNT30, CNT20 and conventional electrodes calculated based on 5 mg/cm² active material loading.

FIG. 11f shows power density of CNT30, CNT20 and conventional electrodes calculated based on the total weight of electrode and voltage plateau at 10 C.

FIG. 12b is a photo showing a blue LED is powered up by the $LiNi_{0.5}Mn_{1.5}O_4$/MWCNT electrodes under bending.

FIG. 12c is a photo showing a blue LED is powered up by the $LiNi_{0.5}Mn_{1.5}O_4$/MWCNT electrodes under bending.

FIG. 14a shows the open circuit voltage of LNMO/MWCNT electrode at a bending radius of 1.6 cm over 10 hours.

FIG. 14b shows the open circuit voltage of LNMO/MWCNT electrode at a bending radius of 2.1 cm over 10 hours.

FIG. 14c shows the open circuit voltage of LNMO/MWCNT electrode at a bending radius of 2.7 cm over 10 hours.

FIG. 14d shows the open circuit voltage of LNMO/MWCNT electrode in a flat state over 10 hours.

DETAILED DESCRIPTION

Figure 1A:
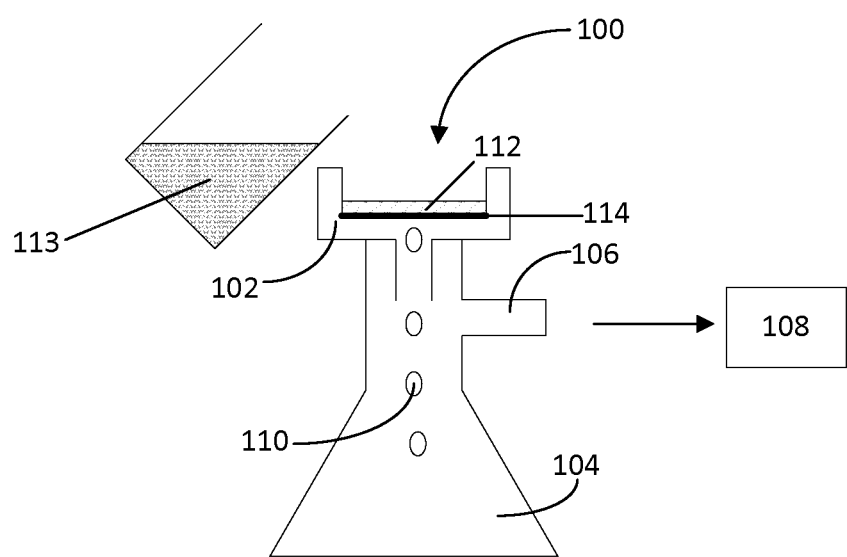
FIG. 1a shows an apparatus that can be used to prepare network electrodes.

FIG. 1a shows an apparatus 100 that can be used to prepare electrodes via vacuum filtration. The apparatus 100 includes a filter funnel 102 supported by a receiving container 104. The container 104 includes a vacuum port 106 which is connected to a vacuum source 108. The vacuum can be a few Torr. The area of the electrode is determined by the dimensions of the filter funnel used. Vacuum provided by the vacuum source 108 helps filtrate 110 pass through the filter funnel 102, allowing a residue that forms the electrode to remain on the filter funnel 102.

One example of an electrodes that can be formed using the apparatus 100 is a free-standing active material/nanomaterial network electrode. The active material can include $LiNi_{0.5}Mn_{1.5}O_4$ (LNMO), Si, S, and other traditional cathode and anode materials such as $LiCoO_2$ cathode and graphite anode. The nanomaterial network can include carbon nanofiber (CNF) or carbon nanotubes (CNT). CNTs can include multi-wall carbon nanotubes (MWCNT). One example of such a network electrode is a LNMO/CNF network electrode. Instead of or in addition to CNF, carbon nanotubes (CNT) can also be used to form a flexible and conductive network that allows active materials, such as LNMO particles to be incorporated therein. Such LNMO/CNT network films are flexible, and the electrodes made from such flexible films can be used to make flexible lithium ion batteries which are light-weight and high-power. Such batteries can be the power source for ultrathin/ultralight or flexible electronics. Other active materials besides LNMO can also be incorporated into the CNT network using the methods described below to make light-weight, flexible and high power electrodes for lithium ion batteries.

A thin layer 112 of CNFs is prepared via vacuum filtration on a filter paper 114 placed on the filter funnel 102. The thin layer 112 of CNF can be 1 μm or thicker.

The CNFs can be hollow CNFs mass-produced by and obtained from Pyrograf Products Inc., of Cedarville, Ohio. (Pyrograf-III, Carbon Nanofiber, PR-24-XT-HHT, batch information: PS 1392 BOX 5 HT 183). The CNFs can be produced via chemical vapor deposition and heat-treated afterwards to graphitize the carbon overcoat on the surface. According to the manufacturer, the CNFs were highly conductive after heat treatment. The average diameter was 100 nm and surface area was 35-45 $m^2/g$. The fibers can be more than 10 μm long.

MWCNTs were prepared via fluidized bed catalytic chemical vapor deposition as reported in literature. The MWCNTs were washed with HF and $H_2O_2$ twice to mildly oxide the surface before use. The MWCNTs were then dispersed in N-Methyl-2-pyrrolidone by shaking in a vortex mixer. About one quarter of the MWCNT suspension was taken out to be used for top and bottom layer of the $LiNi_{0.5}Mn_{1.5}O_4$/MWCNT electrodes. $LiNi_{0.5}Mn_{1.5}O_4$ particles were added to the rest of the MWCNT suspension and dispersed by shaking again.

Prior to vacuum filtration, the CNFs were treated with nitric acid and sulfuric acid (3:1, v/v) at 90° C. overnight in order to break up bundles of aggregated CNFs. As long as no aggregation of CNF based on visual inspection, the ratio of the CNF to the nitric and sulfuric acid mixture is not critical. In some embodiments, the mixture of these acids and CNF is sent through the filter funnel 102, and DI water is added to the CNF residue 112 to wash the CNF (the DI water being removed as a filtrate, using vacuum filtration.

In general, methods other than vacuum filtration, such as spraying or spinning a mixture of CNF (or CNT) and acids on a surface and letting the mixture dry prior to washing and drying with DI, can be used to produce the CNF or CNT films. The CNFs were then washed with DI water and collected by filtration.

Figure 1D:
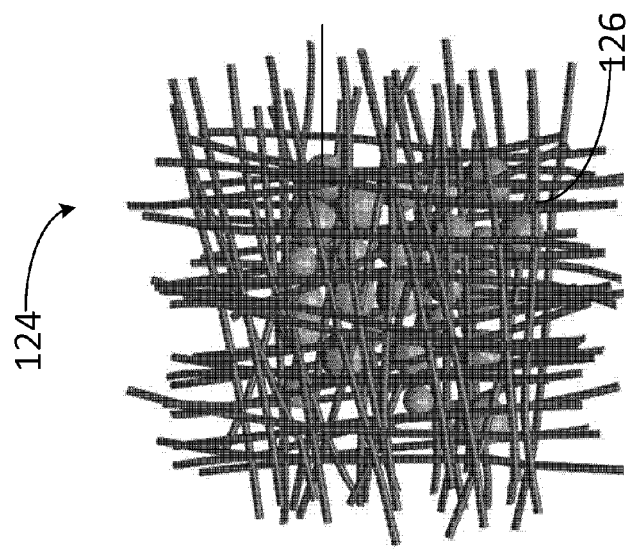
FIG. 1d is a schematic of the composite film of FIG. 1c covered with a CNF thin layer.

The thin layer 112 of CNF formed as a residue on the filter funnel 102 as shown in FIG. 1a is obtained after a first mixture containing the CNF, nitric acid and sulfuric acid is vacuum filtered. A schematic of the thin layer 112 of CNF is shown in FIG. 1B. In general, the deposition of CNF is random, and the strands do not line up in any specific direction. Strands 116 and 118 are randomly oriented to form a network pattern.

A mixture 113 of $LiNi_{0.5}Mn_{1.5}O_4$ (LMNO) particles mixed with CNF suspended in a solution of ethanol (or any solvent which CNF and CNT does not react with, such as water) is poured through the filter funnel 102 directly over the thin layer 112 of CNF. The result is several CNF grid network layers, each containing embedded LMNO particles deposited above the thin layer 112 of CNF. Thin layer 112 forms the bottom CNF thin layer. The solution in which LMNO and CNF is suspended is removed by vacuum filtration to yield a free-standing $LiNi_{0.5}Mn_{1.5}O_4$/CNF composite intermediate film that forms part of the network electrode. Different weight ratio of CNFs and $LiNi_{0.5}Mn_{1.5}O_4$ particles can be used. For example, weight ratio of CNFs and $LiNi_{0.5}Mn_{1.5}O_4$ particles can be 1:1, 1:3 and 1:5, denoted by CNF1/2, CNF1/4 and CNF1/6, respectively.

Figure 1C:
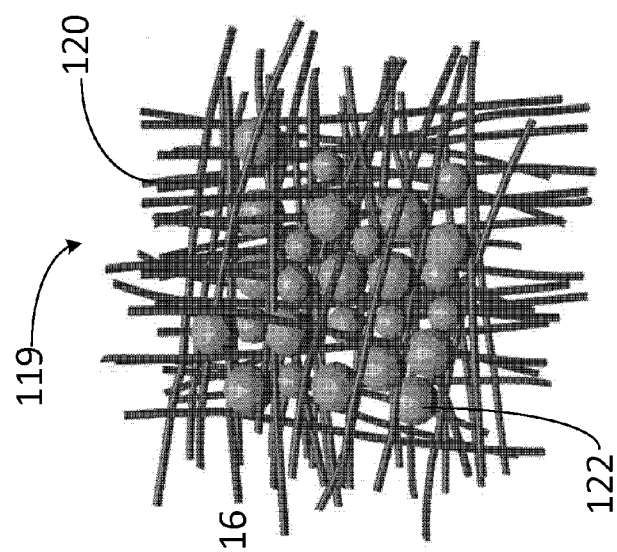
FIG. 1c shows a schematic of a composite film added to the bottom CNF thin layer of FIG. 1b.
Figure 1B:
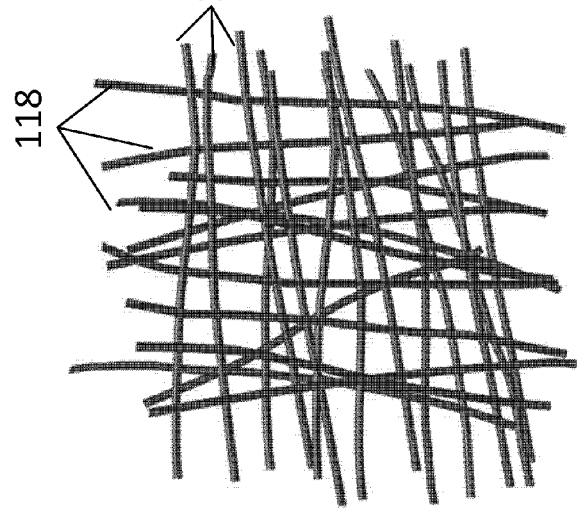

FIG. 1c shows a schematic diagram of the free-standing composite intermediate film 119. The CNF layers 120 form grid-like networks, similar to the structure displayed by the thin layer 112 of CNF. LMNO particles 122 are embedded in the CNF layers 120. Each LMNO particle can occupy a separate grid spacing in the CNF layer 120. The CNF layer helps to orient the LMNO particles in a grid pattern, providing better access of the LMNO to electrolytes. Embedding the LMNO particles in a grid pattern helps to reduces aggregation of LMNO. Aggregation can cause LMNO within the aggregated cluster to be less accessible to electrolytes. The density of the embedded LMNO particles depends on the weight ratio of the LMNO and CNF used to make the free-standing composite film.

$LiNi_{0.5}Mn_{1.5}O_4$ can be synthesized via a variety of methods, such as co-precipitation, solid state reaction, sol-gel method, thermal polymerization, molten salt method, and so on. Among these methods, co-precipitation and solid state reaction are adopted since they are most scalable and compatible with industrial processing.

A modified solid state reaction described below, which has the potential for large scale applications, can be used to prepare $LiNi_{0.5}Mn_{1.5}O_4$ (LMNO). Solid nickel acetate (Ni$(Ac)_2.4H_2O$) and solid manganese acetate (Mn$(Ac)_2.4H_2O$) can be mixed at a molar ratio of Ni:Mn=1:3 and hand-milled in a mortar. The solid mixture can then be heated up from room temperature to 500° C. at a heating rate of 3° C./min. Heating at rates higher than 3° C./min may not provide sufficient time for the solid mixture to thermalize and may compromise the quality of product. After 5 hours of heating, solid lithium acetate (LiAc.$2H_2O$) can be added to the mixture with a molar ratio of Li:Ni:Mn=2.1:1:3 (5% excess lithium acetate was added in order to make up for the volatilization of Li during calcination), and the mixture was heated to 500° C. for 5 hours again. After that, the mixture was milled and sintered at 950° C. for 10 hours followed by annealing at 700° C. for 10 hours. The temperatures of the sintering and annealing can be adjusted. For example, sintering can be done at temperatures between 700 and 1100° C. The LMNO particles produced are irregular particles having diameters between 1-2 μm.

CNF suspended in a nitric and sulfuric acid solution is then poured through the filter funnel 102 above the free-standing composite intermediate film to form another CNF thin layer as the top layer. The thin layer can be as thin as about 1 µm. The liquid phase mixture used for making this CNF thin layer can be the same as the one used to make the bottom thin CNF layer. The top and bottom CNF layers can help to reduce (e.g., prevent) LMNO from falling out of the free-standing network electrode. As used herein, the weight ratios account for all CNFs used in the electrodes, including CNFs used for surfaces and the CNF grid into which LMNO particles are embedded. FIG. 1d shows a schematic diagram of the free-standing network electrode 124 including the thin top layer 126 of CNF.

The percolation threshold for CNF-containing composites is around or below 3 wt %. The percolation threshold is a material-dependent parameter that can be expressed as a weight percentage of that material for making a porous, continuous structure. The CNF1/2, CNF1/4 and CNF1/6 samples are all above the percolation threshold, and the CNF network is expected to provide good electric conduction. For example, the CNF at or above the percolation threshold is strong enough to hold the particles together to provide good electric conduction.

The nanomaterial layer can be made of carbon nanotubes (CNT), and the method of making LNMO/CNT films is similar to the methods described above. LMNO/MWCNT electrodes were obtained by vacuum filtration. The MWCNT suspension can be partially filtered first to get a thin MWCNT layer before adding the mixture of $LiNi_{0.5}Mn_{1.5}O_4$/MWCNT. The thin MWCNT may be as thin as 1 µm. The rest of the MWCNT suspension can then be added on top to form another MWCNT layer on the surface. The film was then dried and can be easily peeled off from the filter paper.

The top and bottom layer of the network electrode, which can prevent LNMO particles from falling out, can be made of CNTs only. The CNT (and/or the CNF) network film can be assembled into lithium ion batteries directly without using binder, conductive additive or metal current collector, greatly reducing the weight of the electrodes. In addition, due to the high conductivity of CNT network, the electrodes can deliver much higher power than conventional electrodes. The conductivity of CNT is higher than CNF.

Figure 1E:
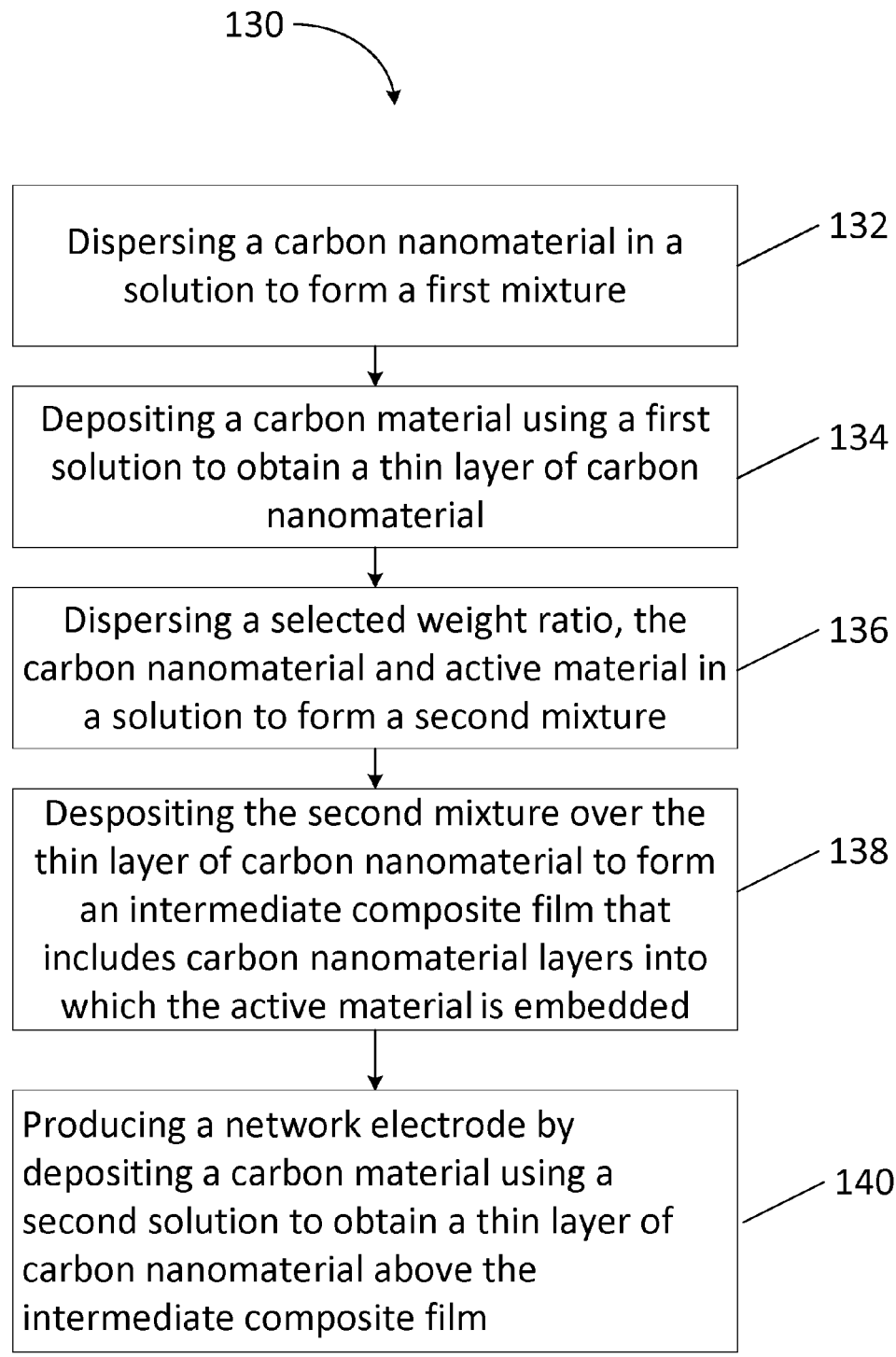
FIG. 1e is a flow chart illustrating the fabrication process of the network electrode.

Flow chart 130 in FIG. 1e shows the steps for forming the network electrode 124. The first step 132 involves dispersing a carbon nanomaterial in a solution to form a first mixture. The carbon nanomaterial can be CNF, or carbon nanotubes. The prepared solution is then deposited, for example, using vacuum filtration, to produce a thin layer of carbon nanomaterial in step 134. A second solution is prepared by dispersing the carbon nanomaterial and active material (e.g., $LiNi_{0.5}Mn_{1.5}O_4$) at a selected weight ratio to form a second mixture in step 136. The second mixture is then deposited in step 138 using, for example, vacuum filtration, over the thin layer of carbon nanomaterial formed in step 134 to form an intermediate composite film that includes carbon nanomaterial layers into which particles of the active materials are embedded. The network electrode 124 is formed after step 140 when the first mixture or another mixture containing a carbon nanomaterial is deposited, for example, by vacuum filtration, over the intermediate composite film formed in step 138.

Figure 1G:
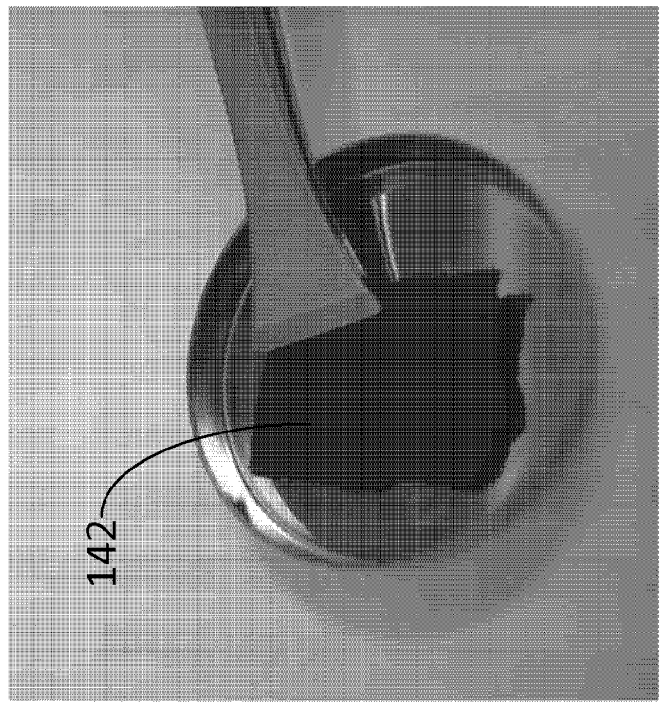
FIG. 1g is a photo of a free-standing $LiNi_{0.5}Mn_{1.5}O_4$/CNF network electrode before assembly into a battery.
Figure 1F:
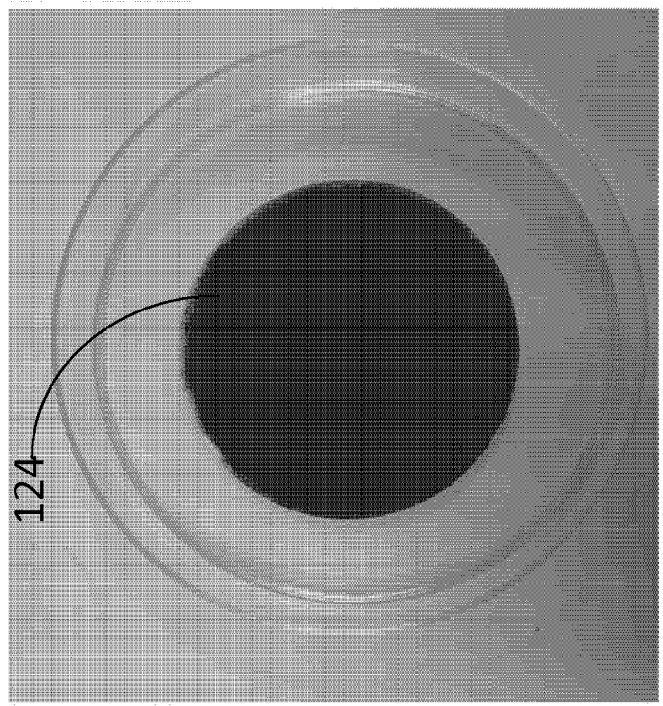
FIG. 1f is a photo of a $LiNi_{0.5}Mn_{1.5}O_4$/CNF network after filtration.

FIG. 1f is a digital image of the $LiNi_{0.5}Mn_{1.5}O_4$/CNF network electrode 124 formed after step 140.

The network electrode 124 shown in FIG. 1f can be easily peeled off, after drying, from the filter paper 114 and cut into small electrodes 142 to be assembled in coin cells Other types of cells are possible. FIG. 1g is a digital image of the free-standing electrode 142 that is cut into coin cell size and ready for assembling.

Traditionally, metal foils are used in batteries as current collectors, which serves as a conductive support for electron transport. For active cathode material and carbon black in the form of particles, polymer binders such as poly(vinylidene fluoride) (PVDF) are used to connect the particles to the metal current collector in a battery.

The LNMO/CNF network electrodes 124 are free-standing and because the constituent CNF network is conductive, it is not necessary to attach the LNMO/CNF network onto a current collector.

The CNFs are entangled and form a network configuration, allowing the LNMO particles 122 to be trapped therein and be connected by the CNF network 120, obviating the need for using a binder. The CNF (or CNT) can become entangled simply by removing the solvent from which the CNF (or CNT) was suspended. In addition, due to the conducive nature of CNFs, conductive additives such as carbon black are not needed. As a result, the total weight of the electrode can be reduced (e.g., reduced to 50%, reduced to 40%, reduced to 30%, reduced to 20%, reduced to 10% compared to a battery containing conductive additives.). In other words, the whole electrode is exclusively made of $LiNi_{0.5}Mn_{1.5}O_4$ particles and CNFs. The CNF layers 112, 120, and 126 are a binder, a conductive additive and a current collector of the network electrode.

Figure 1H:
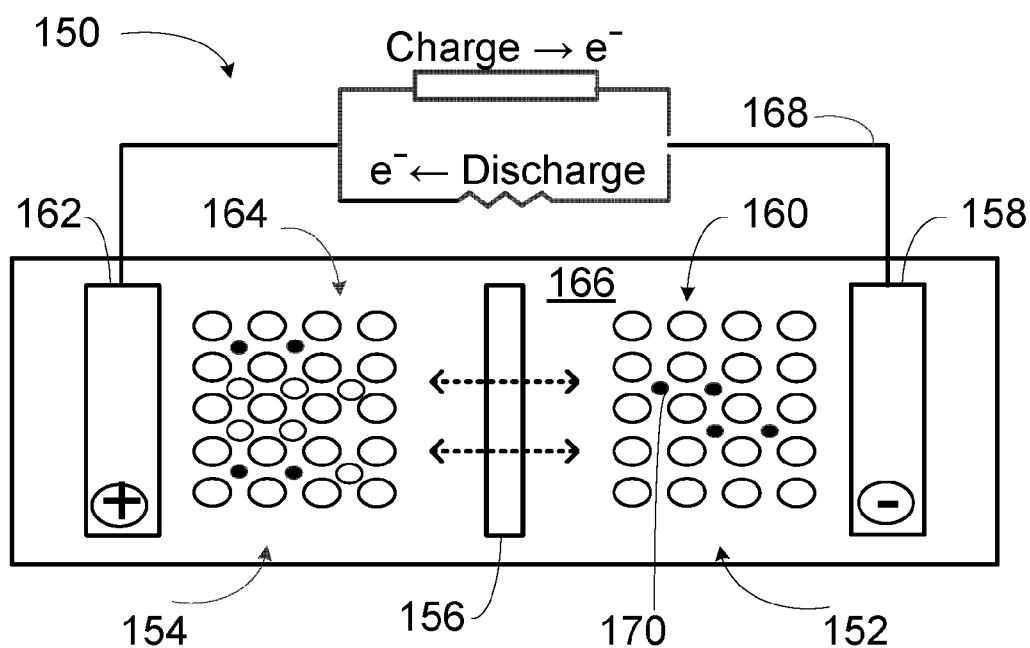
FIG. 1h is a schematic diagram of a lithium-ion battery.

FIG. 1g depicts a lithium-ion battery (LIB) 150 having an anode 152 and a cathode 154. The anode 152 and the cathode 154 are separated by a separator 156. The anode 152 includes an anode collector 158 and an anode material 160 in contact with the anode collector. Cathode 154 includes a cathode collector 162 and a cathode material 164 in contact with the cathode collector. An electrolyte 166 is in contact with the anode material 160 and the cathode material 164. The anode collector 158 and cathode collector 162 are electrically coupled via a closed external circuit 168. The anode material 160 and cathode material 164 are materials into which, and from which, lithium ions 170 can migrate. During insertion (lithiation or intercalation) lithium ions move into the electrode (anode or cathode) material. During extraction (delithiation or deintercalation), the reverse process, lithium ions move out of the electrode (anode or cathode) material. When a LIB is discharging, lithium ions are extracted from the anode material and inserted into the cathode material. When the cell is charging, lithium ions are extracted from the cathode material and inserted into the anode material. The arrows in FIG. 1h depict movement of lithium ions through separator 156 during charging and discharging.

Figure 2A:
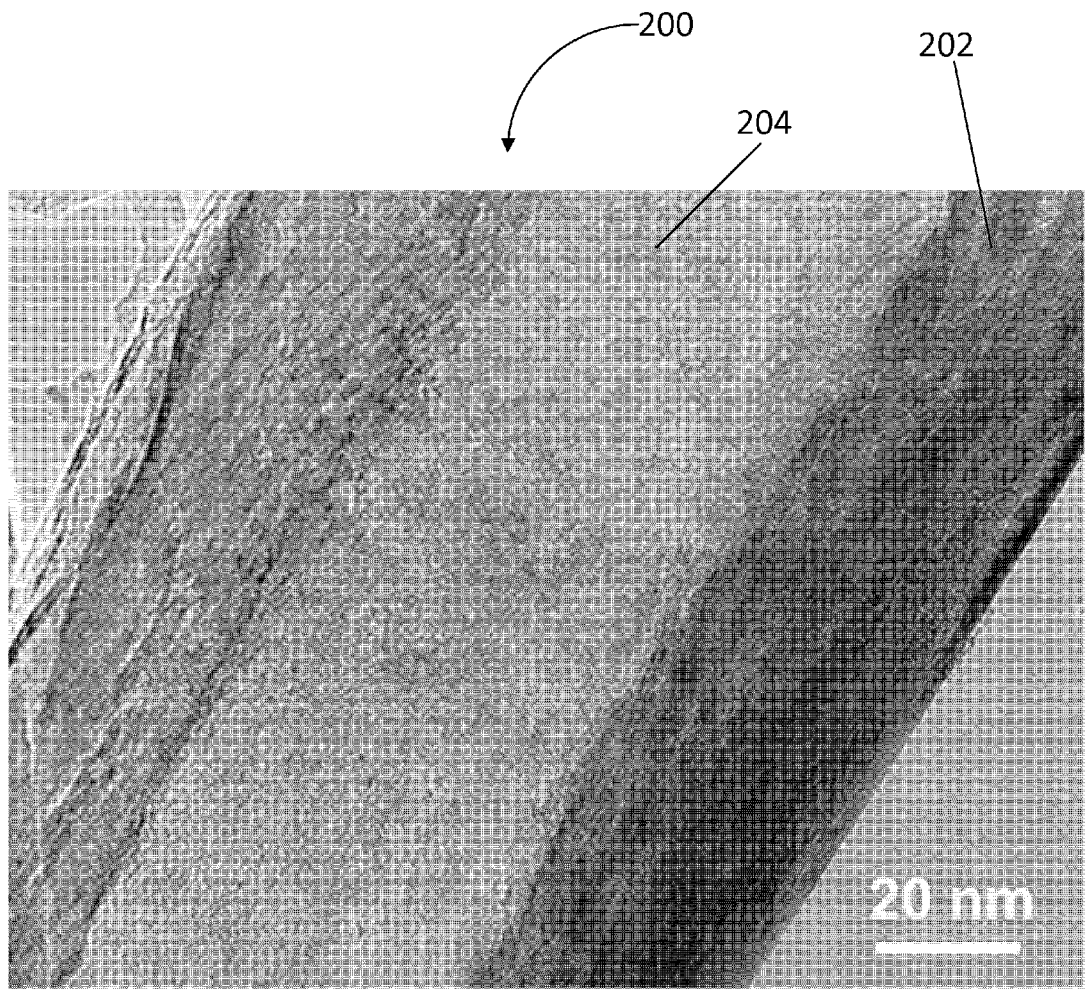
FIG. 2a is a transmission electron microscope (TEM) image of CNF.
Figure 2B:
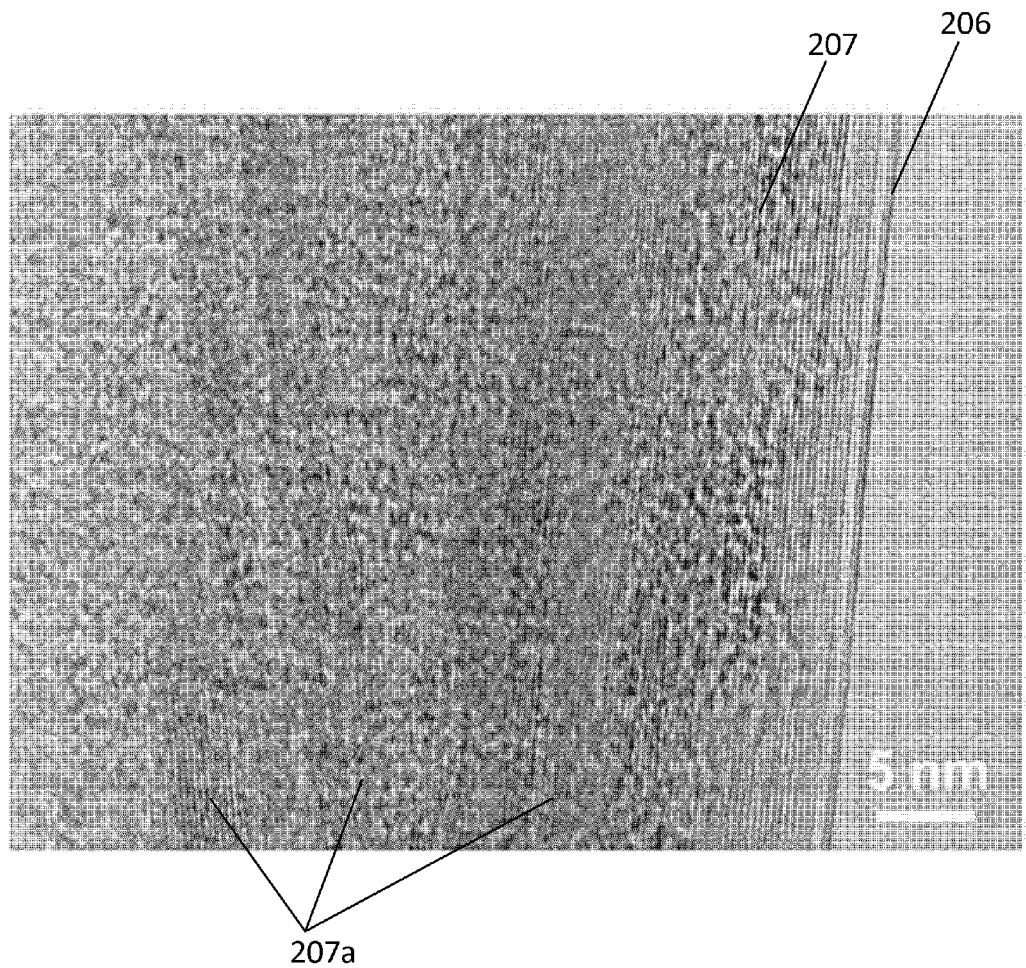
FIG. 2b is a high resolution transmission electron microscope (HRTEM) image of CNF.

TEM images of the CNFs are shown in FIGS. 2a and 2b. FIG. 2a shows an image of a CNF 200. The darker regions 202 depict the carbon wall of the CNF, while the lighter region 204 is the hollow core surrounded by the carbon wall. Given the scale bar of 20 nm, the thickness of the carbon wall of the CNF is about 35 nm. The outer diameter of the CNFs is over 100 nm and the inner diameter is 50-60 nm.

FIG. 2b is a HRTEM image showing the detailed structure of the walls. Layered structure of the walls 206 and 207 can be clearly seen. The graphitic nature (i.e., the layered structure of the wall) of the CNFs is beneficial in enhancing the conductivity of the electrodes thus leading to superior performance under large current density and fast charge/discharge.

Figure 2C:
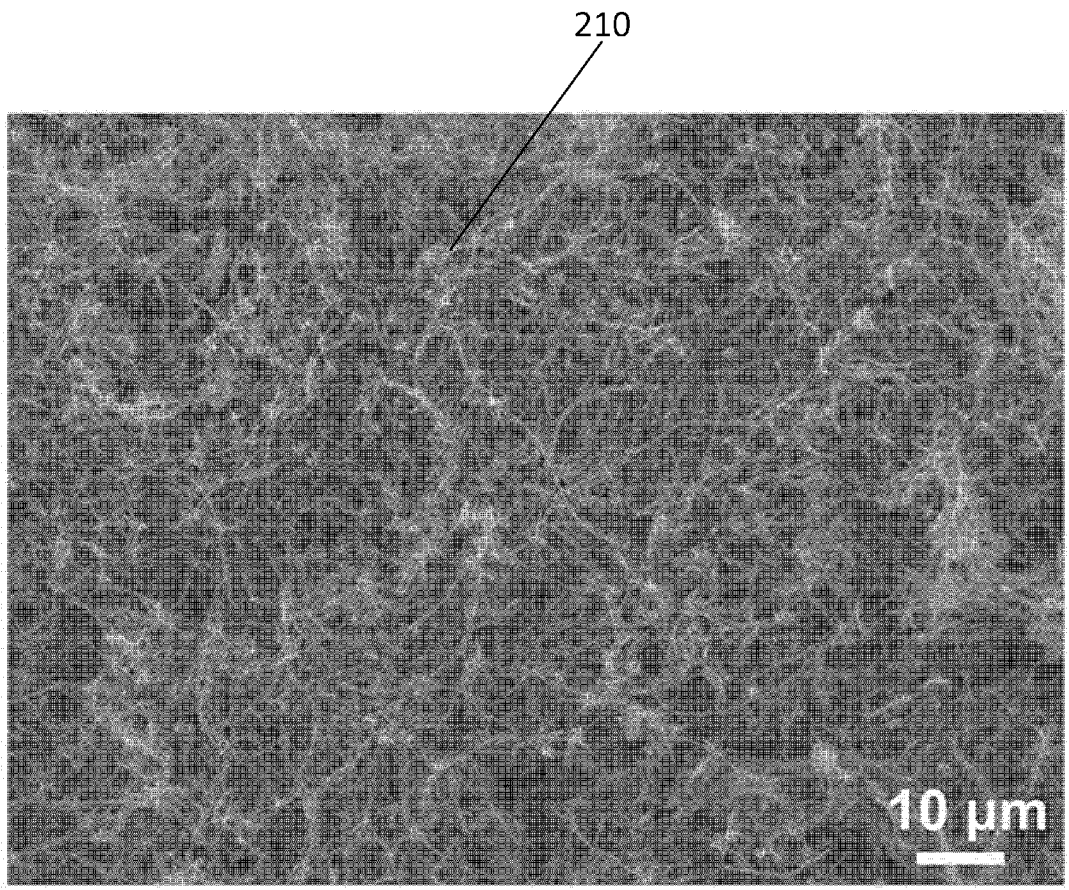
FIG. 2c is a scanning electron microscope (SEM) image of the surface of the $LiNi_{0.5}Mn_{1.5}O_4$/CNF network electrode.

FIG. 2c shows a SEM image of the surface of the free-standing $LiNi_{0.5}Mn_{1.5}O_4$/CNF network electrode. It is apparent that the surface is covered by CNF network and no $LiNi_{0.5}Mn_{1.5}O_4$ particle can be seen. The CNFs are over 100 μm in length and are entangled with each other. The entangled CNFs forms a mesh that allows $LiNi_{0.5}Mn_{1.5}O_4$ particles to be fully utilized by minimizing (e.g., eliminating) the chances of the LMNO particles being lost from the network electrode during battery assembly or cycling.

Figure 2D:
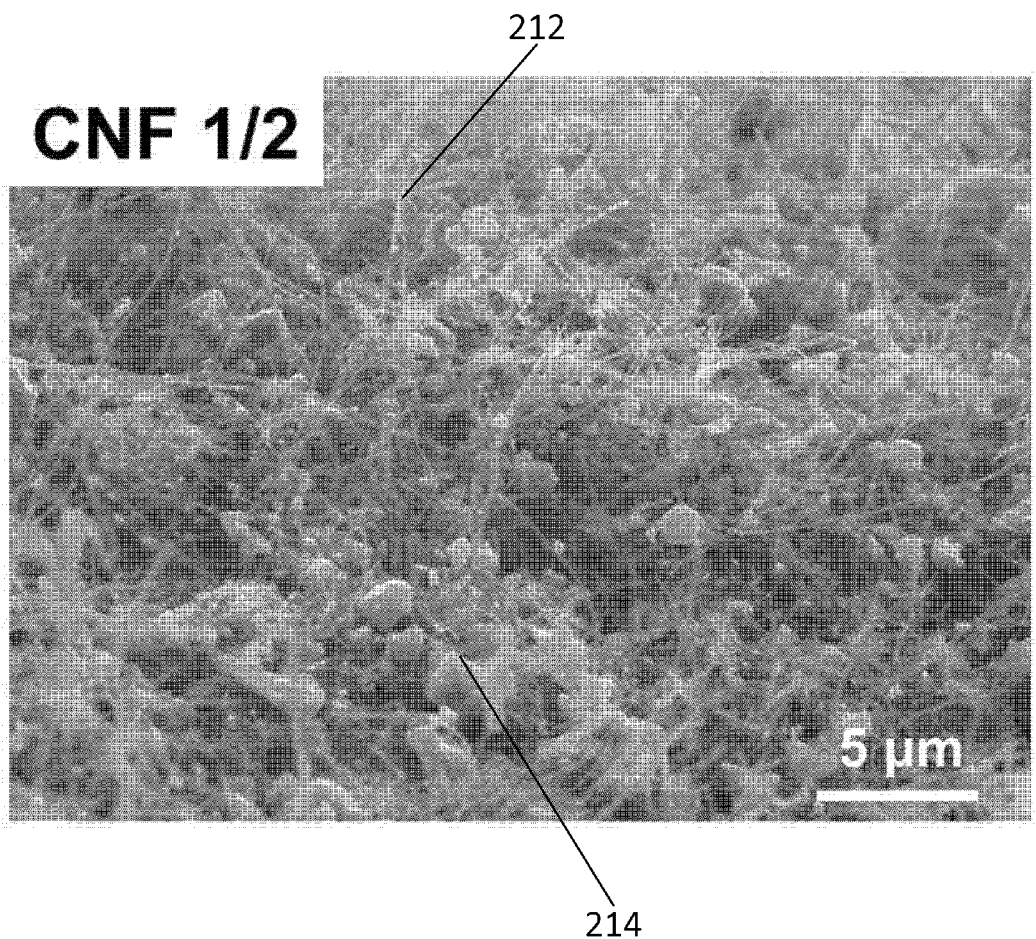
FIG. 2d is a SEM image of the inside of a $LiNi_{0.5}Mn_{1.5}O_4$/CNF network electrode having a ratio of $LiNi_{0.5}Mn_{1.5}O_4$/CNF of 1:2.
Figure 2E:
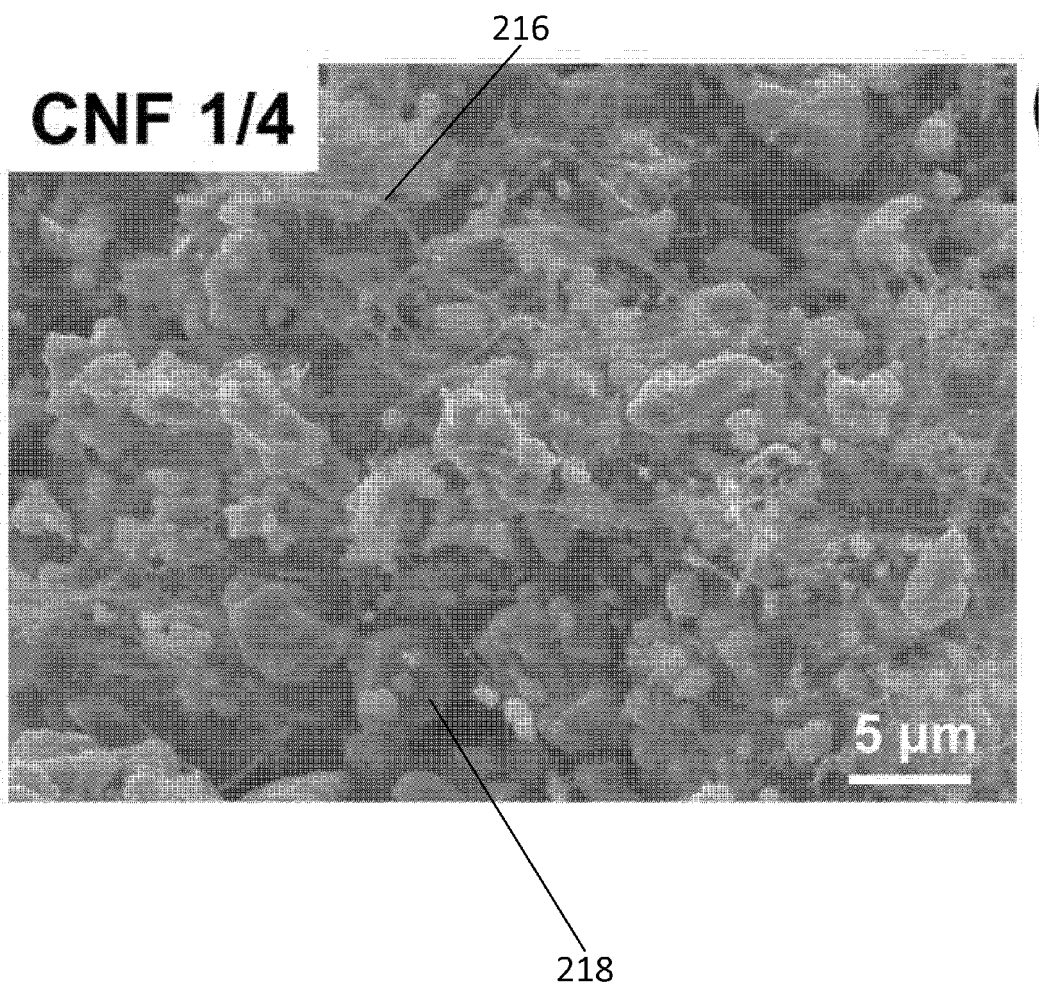
FIG. 2e is a SEM image of the inside of a $LiNi_{0.5}Mn_{1.5}O_4$/CNF network electrode having a ratio of $LiNi_{0.5}Mn_{1.5}O_4$/CNF of 1:4.
Figure 2F:
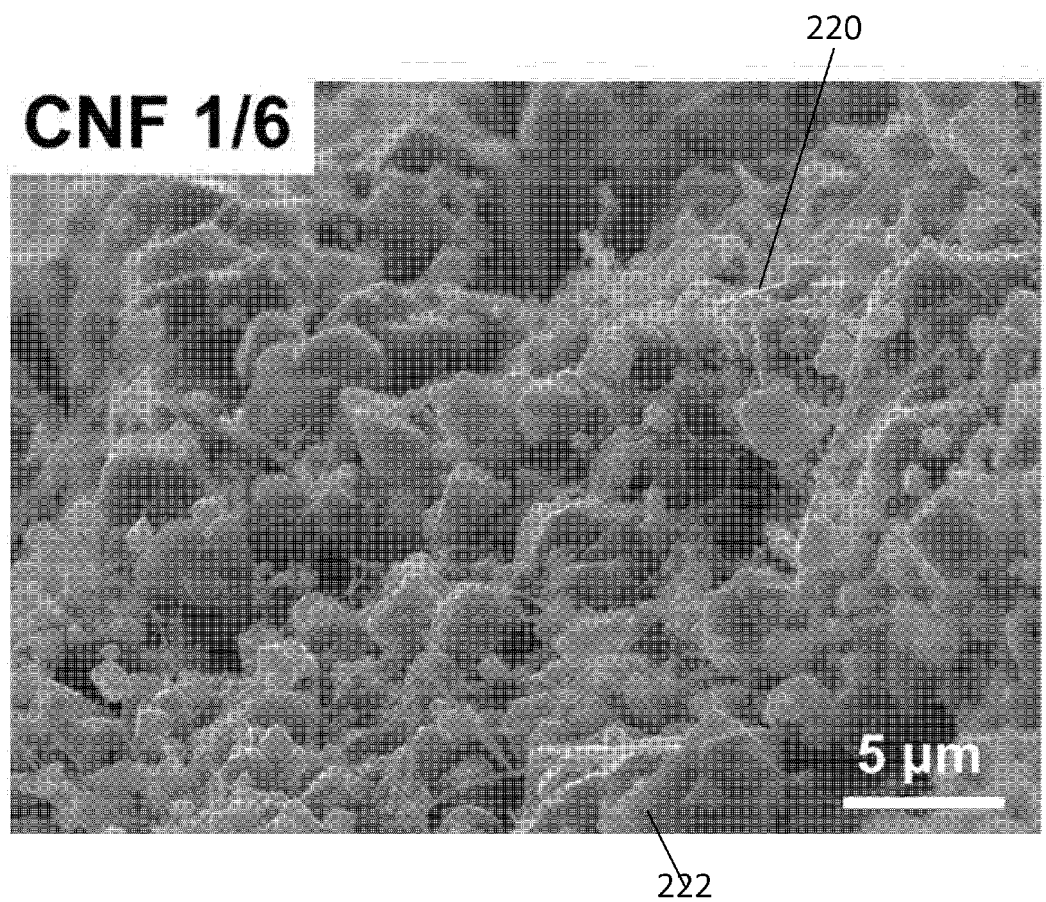
FIG. 2f is a SEM image of the inside of a $LiNi_{0.5}Mn_{1.5}O_4$/CNF network electrode having a ratio of $LiNi_{0.5}Mn_{1.5}O_4$/CNF of 1:6.

FIGS. 2d, 2e and 2f reveal the interior of the $LiNi_{0.5}Mn_{1.5}O_4$/CNF composite electrodes where CNFs make up ½, ¼ and ⅙ of the total weight, respectively. FIG. 2d shows CNF 212 and LMNO particles 214. FIG. 2e shows CNF 216 and LMNO particles 218. FIGS. 2d and 2e are taken at the same magnification and the LMNO particles in FIG. 2e are larger and denser than those in FIG. 2d. FIG. 2f shows CNF 220 and LMNO particles 222. The density of LMNO particles 222 is higher in FIG. 2f than in both FIGS. 2d and 2e. The SEM images show that the LNMO particles are evenly distributed in the CNF network. In this way, the CNF network can provide an electronic pathway to the LMNO particles and enhance the conductivity of the whole electrode. In addition, the network is strong enough to accommodate large loading of $LiNi_{0.5}Mn_{1.5}O_4$ particles therein, as in the case of CNF1/6 sample, the CNF network can hold a total weight of $LiNi_{0.5}Mn_{1.5}O_4$ particles that are five times the weight of CNFs. "Large loading" can mean a high density of LMNO particles, for example, several mg of LMNO per square centimeter area.

Figure 3A:
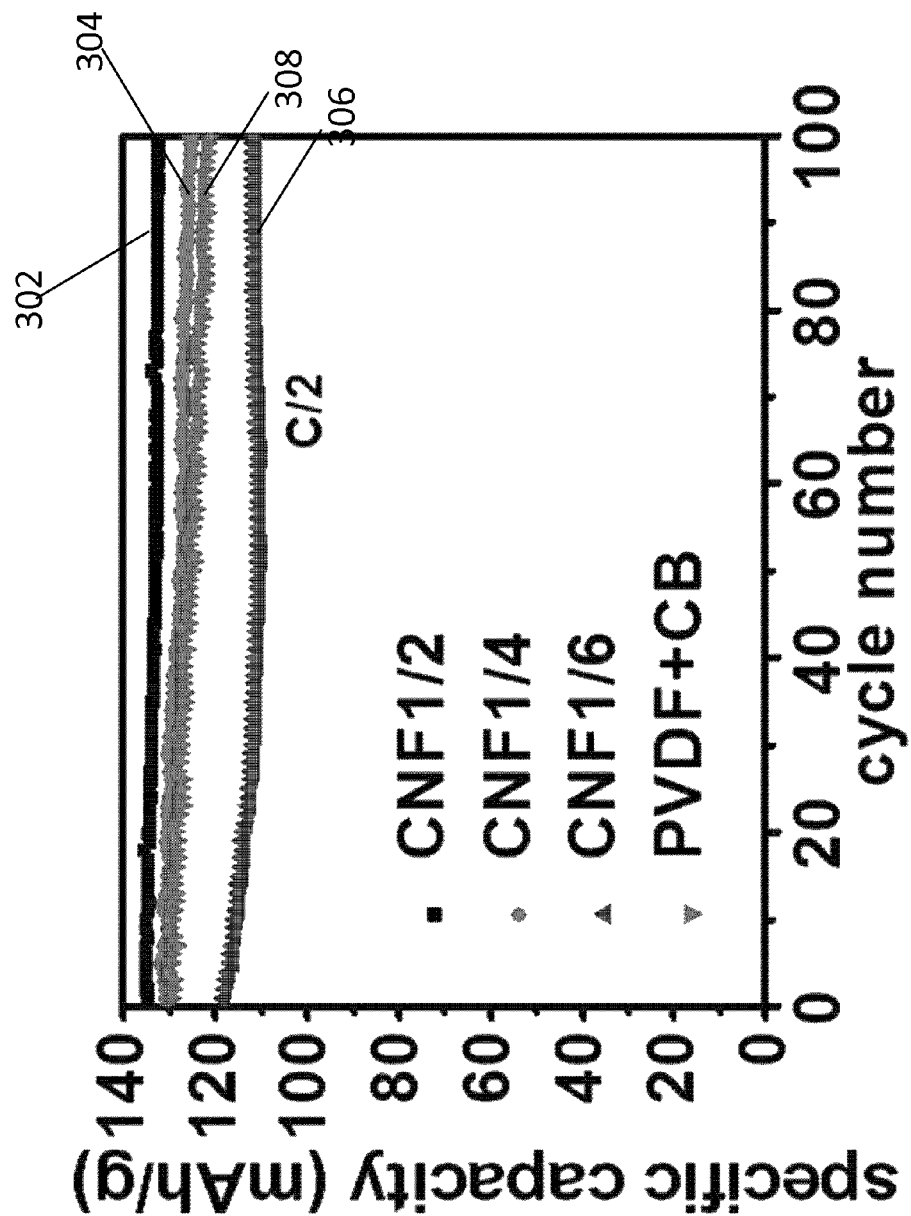
FIG. 3a is a comparison of the specific capacity as a function of cycle numbers for $LiNi_{0.5}Mn_{1.5}O_4$/CNF network electrodes and conventional electrodes at C/2 (1 C=140 mAh/g).

FIG. 3a compares the electrochemical battery test results from free-standing $LiNi_{0.5}Mn_{1.5}O_4$/CNF network electrodes at all three compositions, CNF1/2, CNF1/4, and CNF1/6. The electrochemical measurements were made using CR 2032 coin cells assembled with Li metal as counter electrodes. 1.2 M solution of $LiPF_6$ in ethylene carbonate (EC) and dimethyl carbonate (DMC) (3:7) was used as electrolyte. The batteries were cycled in the voltage range of 3.5 V~5 V. The free-standing $LiNi_{0.5}Mn_{1.5}O_4$/CNF network electrodes were used directly as cathode in batteries. As a control, conventional electrodes which include poly(vinylidene fluoride) and carbon black (PVDF+CB) were also prepared by slurry-casting on Al current collector with weight ratio LMNO:PVDF:CB=8:1:1, and tested under the same conditions. (i.e., electrochemical measurements were made using CR 2032 coin cells assembled with Li metal as counter electrodes. 1.2 M solution of $LiPF_6$ in ethylene carbonate (EC) and dimethyl carbonate (DMC) (3:7) was used as electrolyte. The batteries were cycled in the voltage range of 3.5 V~5 V.). To make a fair comparison, the active material loading of all electrodes was maintained between 2-3 mg/cm².

Plots 302, 304, 306, and 308 of specific capacity measured in mAh/g for CNF1/2, CNF1/4, and CNF1/6, and conventional battery (PVDF+CB), respectively, are plotted against the cycle number. One cycle includes a battery from a low potential (e.g., 0 V) to a high potential (e.g., 5V) and then discharging the battery from the high potential back to the low potential. After 100 cycles at a regular current rate of C/2 (1 C=140 mAh/g), the capacity retention of CNF1/2, CNF1/4, CNF1/6 and conventional electrode is 98.3%, 95.7%, 94.2% and 93.9%, respectively.

Figure 3B:
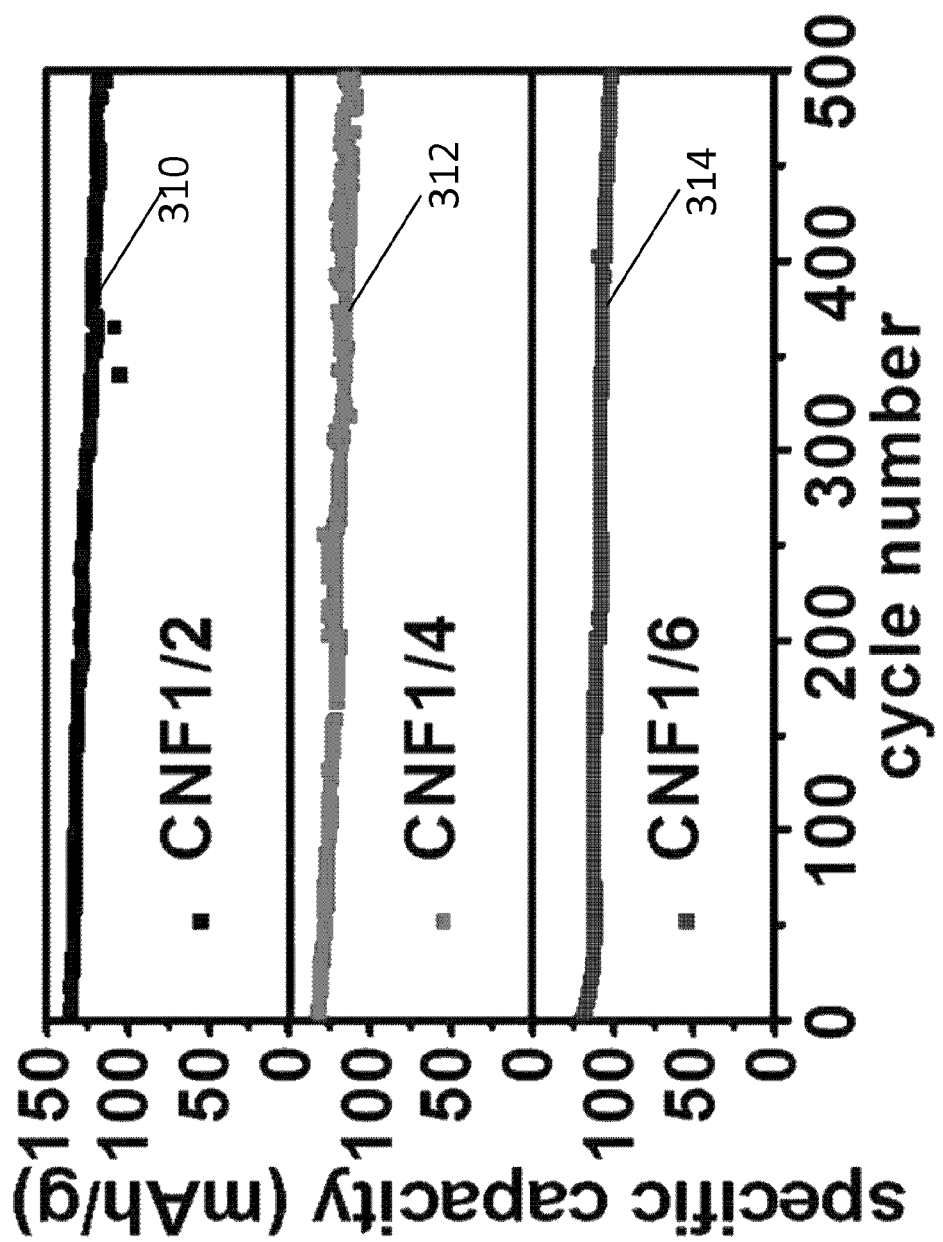
FIG. 3b shows the specific capacity as a function of cycle number up to 500 cycles for various $LiNi_{0.5}Mn_{1.5}O_4$/CNF network electrodes at C/2.

FIG. 3b shows result from extended cycles of CNF1/2, CNF1/4 and CNF1/6 of up to 500 cycles. Plots 310, 312, and 314 are the specific capacities for CNF1/2, CNF1/4, and CNF1/6, respectively, as a function of cycle number. These results demonstrate the cycling stability of the network electrodes up to 500 cycles.

Figure 3C:
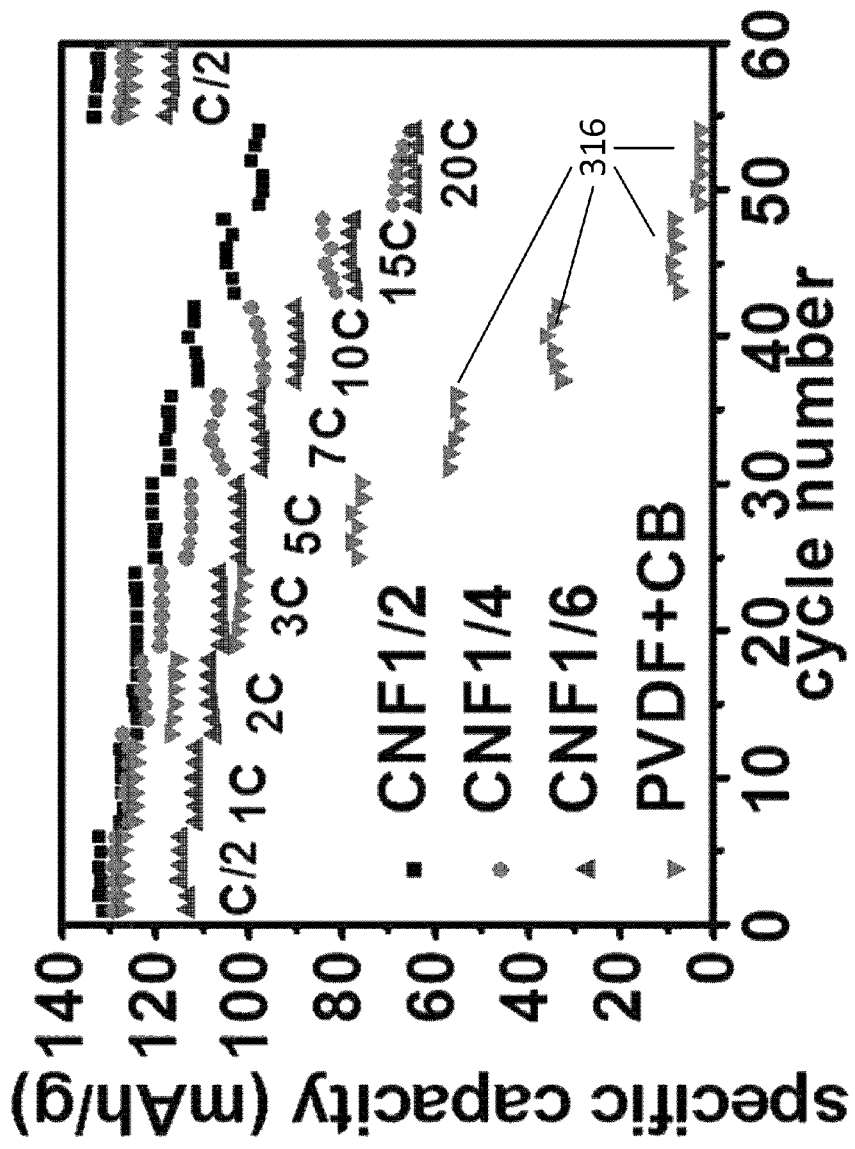
FIG. 3c is a comparison of discharge capacity of $LiNi_{0.5}Mn_{1.5}O_4$/CNF network electrodes and conventional electrodes from C/2 to 20 C while keeping the charging rate at C/2.

Although the specific capacity of conventional electrodes is higher than CNF1/6, it is apparent from FIG. 3c that all free-standing $LiNi_{0.5}Mn_{1.5}O_4$/CNF network electrodes showed much superior performance under large current rates. It is noteworthy that at current rate as large as 20 C, the conventional electrodes showed almost no capacity 316 while the $LiNi_{0.5}Mn_{1.5}O_4$/CNF network electrodes can still deliver 99.3 mAh/g (CNF1/2), 69.0 mAh/g (CNF1/4) and 65.3 mAh/g (CNF1/6). It is evident from the results here CNF network provides much better conductivity to the whole electrode than conventional PVDF and carbon black. The remarkable performance demonstrated the advantages of employing the CNF network to form the electrode structure.

Figure 3D:
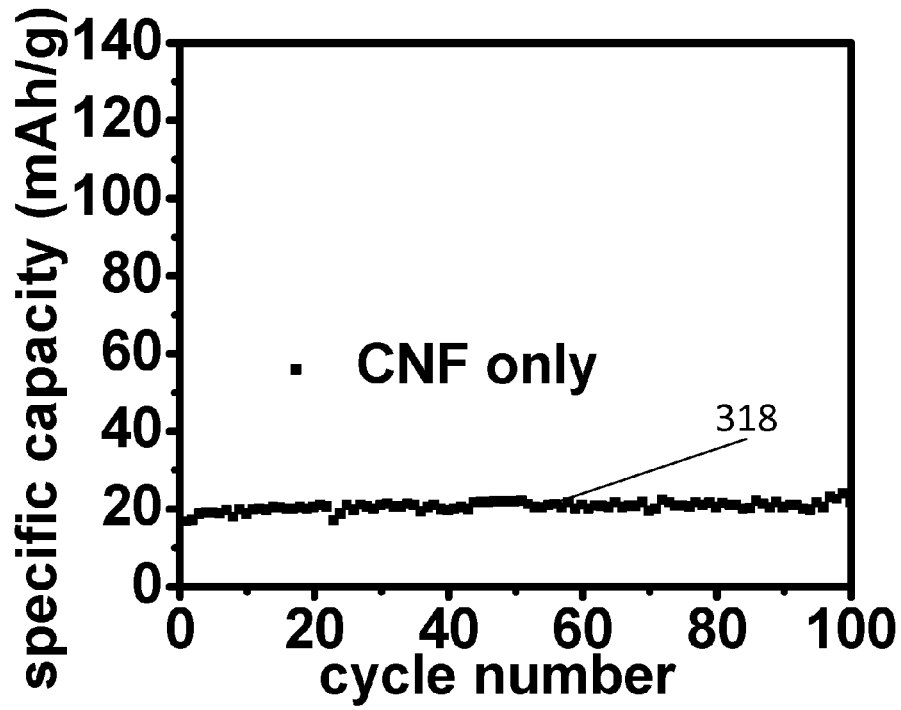
FIG. 3d shows the specific capacity of pure CNF network without $LiNi_{0.5}Mn_{1.5}O_4$ as a function of cycle number in a voltage window of 3.5-5 V.

FIG. 3d shows the electrochemical test results of pure CNF network (i.e., without $LiNi_{0.5}Mn_{1.5}O_4$) in the test voltage window of 3.5-5 V with Li metal as counter electrode. All other conditions were kept the same as battery tests for $LiNi_{0.5}Mn_{1.5}O_4$/CNF network electrodes and conventional electrodes. Data plot 318 shows that CNFs can provide only around 20 mAh/g capacity in the voltage window of 3.5-5 V. In order to eliminate this effect and make fair comparison among all electrodes, we have deducted the capacity of approximately 20 mAh/g from CNFs when calculating the specific capacities.

Figure 3E:
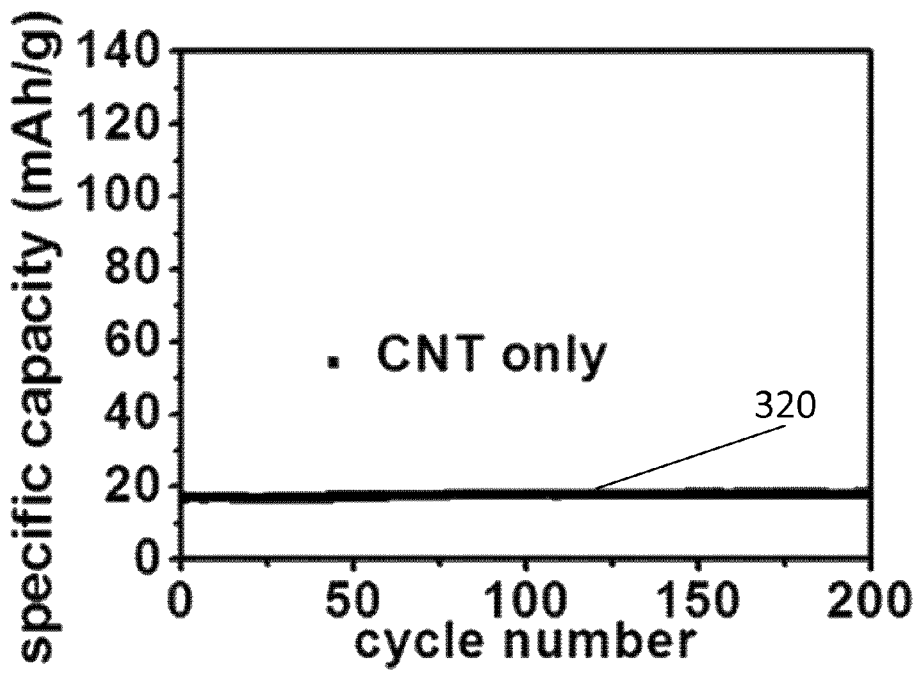
FIG. 3e shows the specific capacity of pure MWCNT network without $LiNi_{0.5}Mn_{1.5}O_4$ as a function of cycle number in a voltage window of 3.5-5 V.

The results of testing pure multiwall carbon nanotubes (MWCNT) network without $LiNi_{0.5}Mn_{1.5}O_4$ in the voltage window of 3.5-5 V with Li metal as counter electrode is shown in FIG. 3e. The fabrication procedure is the same as LNMO/MWCNT electrodes (described later) except that no $LiNi_{0.5}Mn_{1.5}O_4$ particles were added during vacuum filtration. The test conditions were kept the same as battery tests for $LiNi_{0.5}Mn_{1.5}O_4$/MWCNT electrodes. The specific capacity of MWCNT network is shown in FIG. 3e. To make a fair comparison between $LiNi_{0.5}Mn_{1.5}O_4$/MWCNT electrodes and conventional electrodes, the capacity contributed from CNTs when calculating specific capacities for all $LiNi_{0.5}Mn_{1.5}O_4$/MWCNT electrodes is subtracted.

Figure 4A:
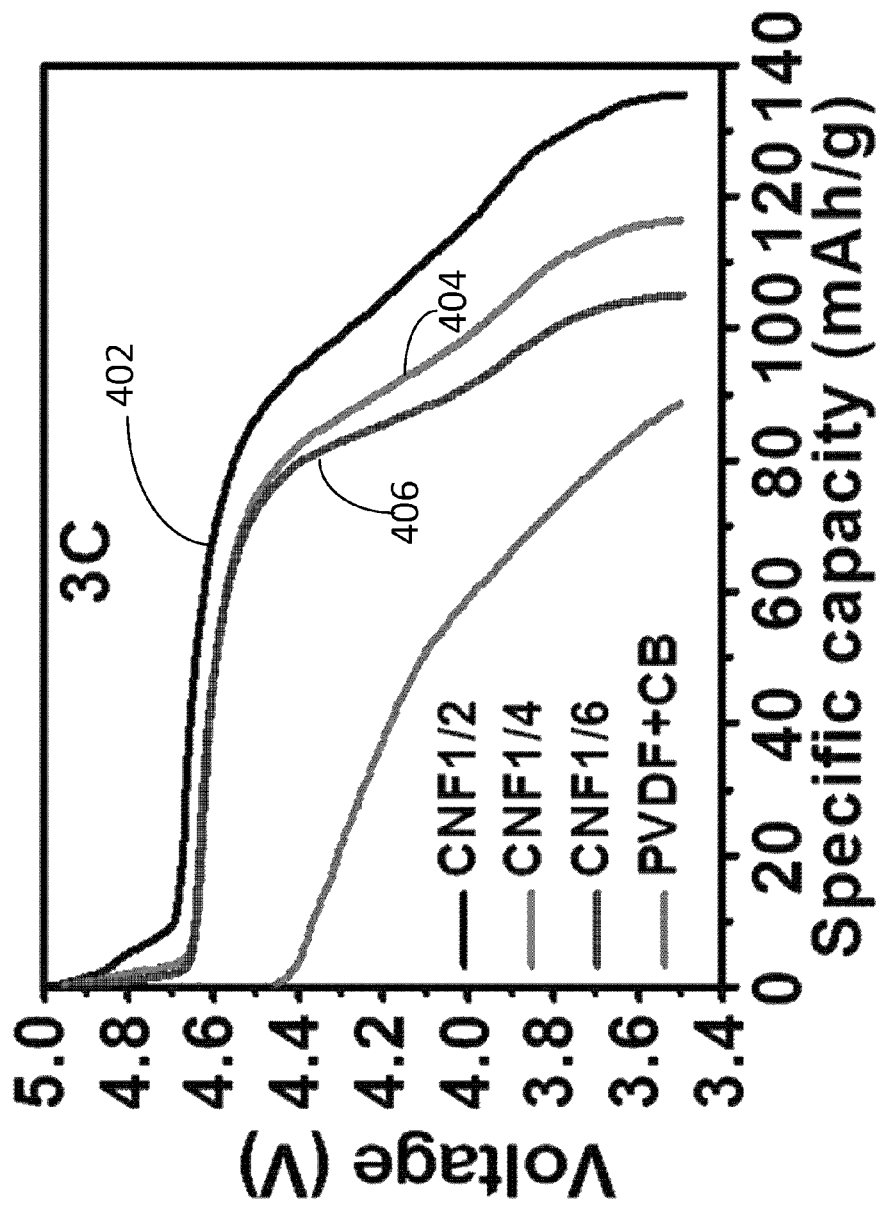
FIG. 4a includes discharge curves showing voltages of $LiNi_{0.5}Mn_{1.5}O_4$/CNF network electrodes and conventional electrodes as a function of specific capacity at 3 C.
Figure 4B:
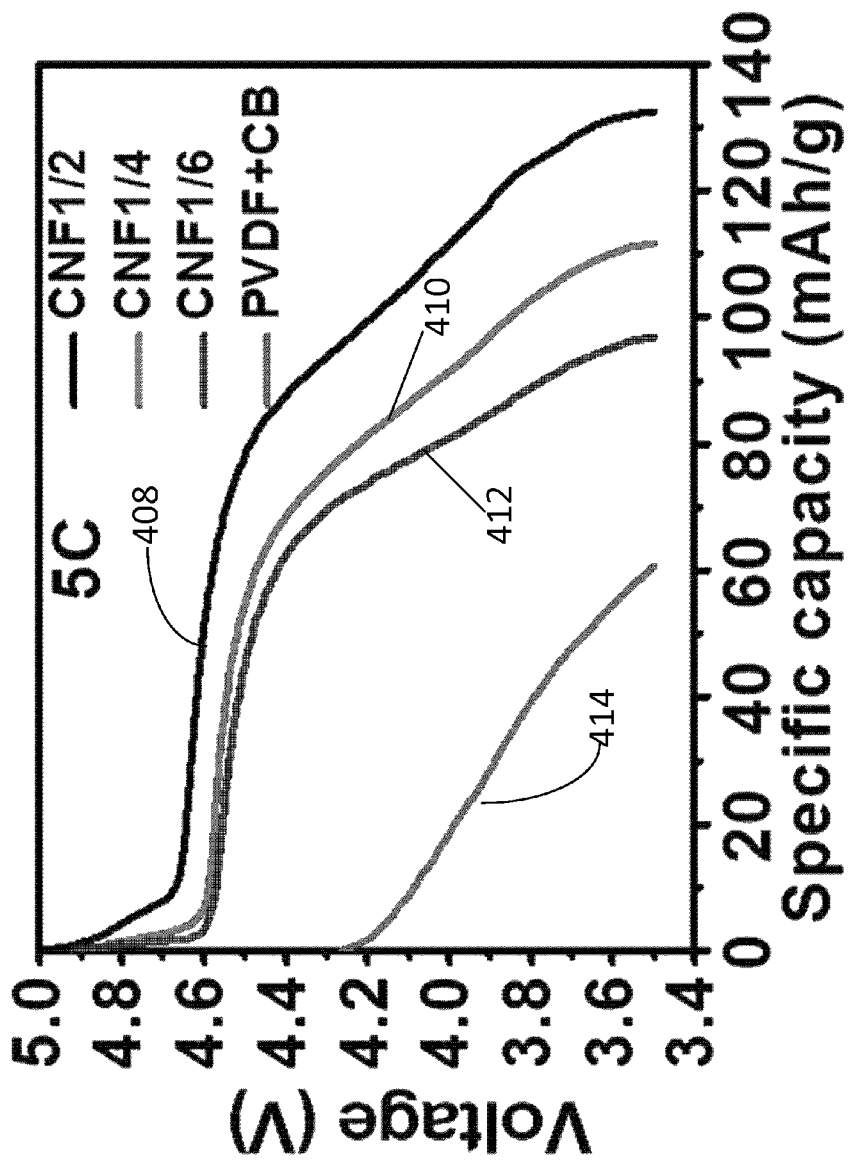
FIG. 4b includes discharge curves showing voltages of $LiNi_{0.5}Mn_{1.5}O_4$/CNF network electrodes and conventional electrodes as a function of specific capacity at 5 C.

To examine the cyclability of the free-standing $LiNi_{0.5}Mn_{1.5}O_4$/CNF network electrodes at large current rate, the batteries were tested at 3 C and 5 C for 100 cycles continuously. FIGS. 4a and 4b show discharge curves at 3 C and 5 C, respectively. The CNF1/2 electrodes maintained a high voltage plateau 402 at 4.67 V at 3 C, while the CNF1/4 and CNF1/6 electrodes provided high voltage plateaus 404 and 406 at 4.62 V. At 5 C, CNF1/2 electrodes kept a working voltage (i.e., the "voltage plateau") 408 of 4.64 V while the working voltages 410 and 412 of CNF1/4 and CNF1/6 electrodes slightly decreased to 4.58 V and 4.56 V, respectively. Comparing to the free-standing $LiNi_{0.5}Mn_{1.5}O_4$/CNF network electrodes, it is apparent that conventional electrodes cannot maintain the working voltage 414 during large current cycling, and hence the energy and power provided by these batteries has been severely reduced.

Figure 4C:
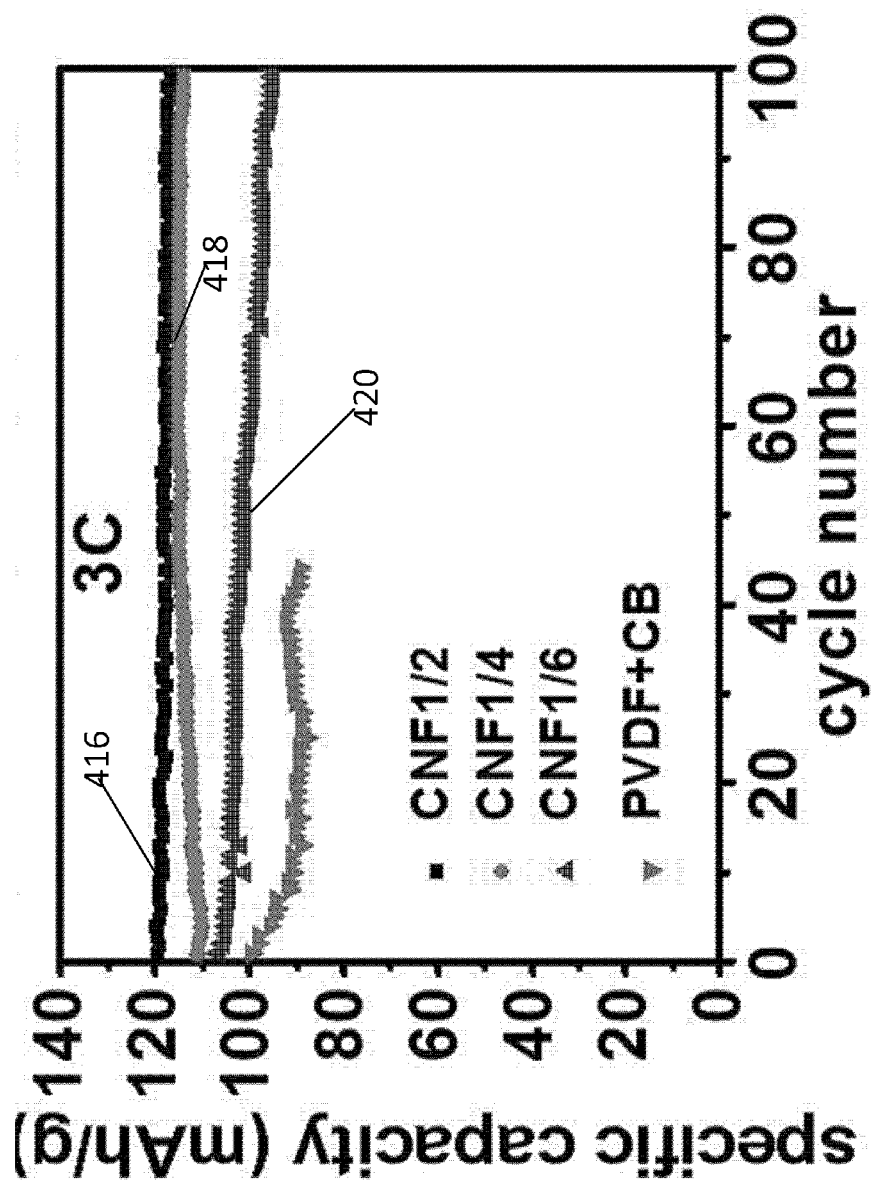
FIG. 4c plots voltage of $LiNi_{0.5}Mn_{1.5}O_4$/CNF network electrodes and conventional electrodes as a function of cycle number at 3 C.
Figure 4D:
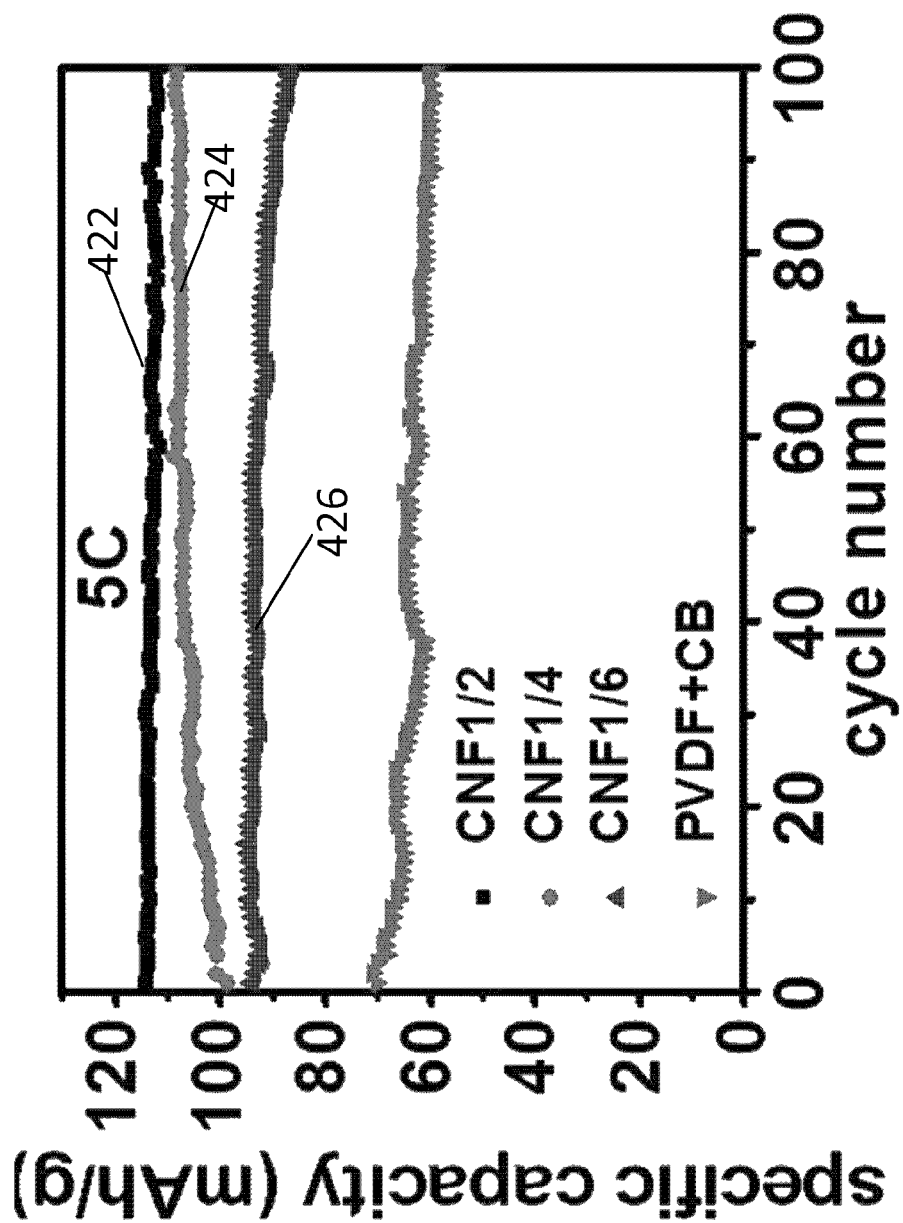
FIG. 4d plots voltage of $LiNi_{0.5}Mn_{1.5}O_4$/CNF network electrodes and conventional electrodes as a function of cycle number at 5 C
Figure 5A:
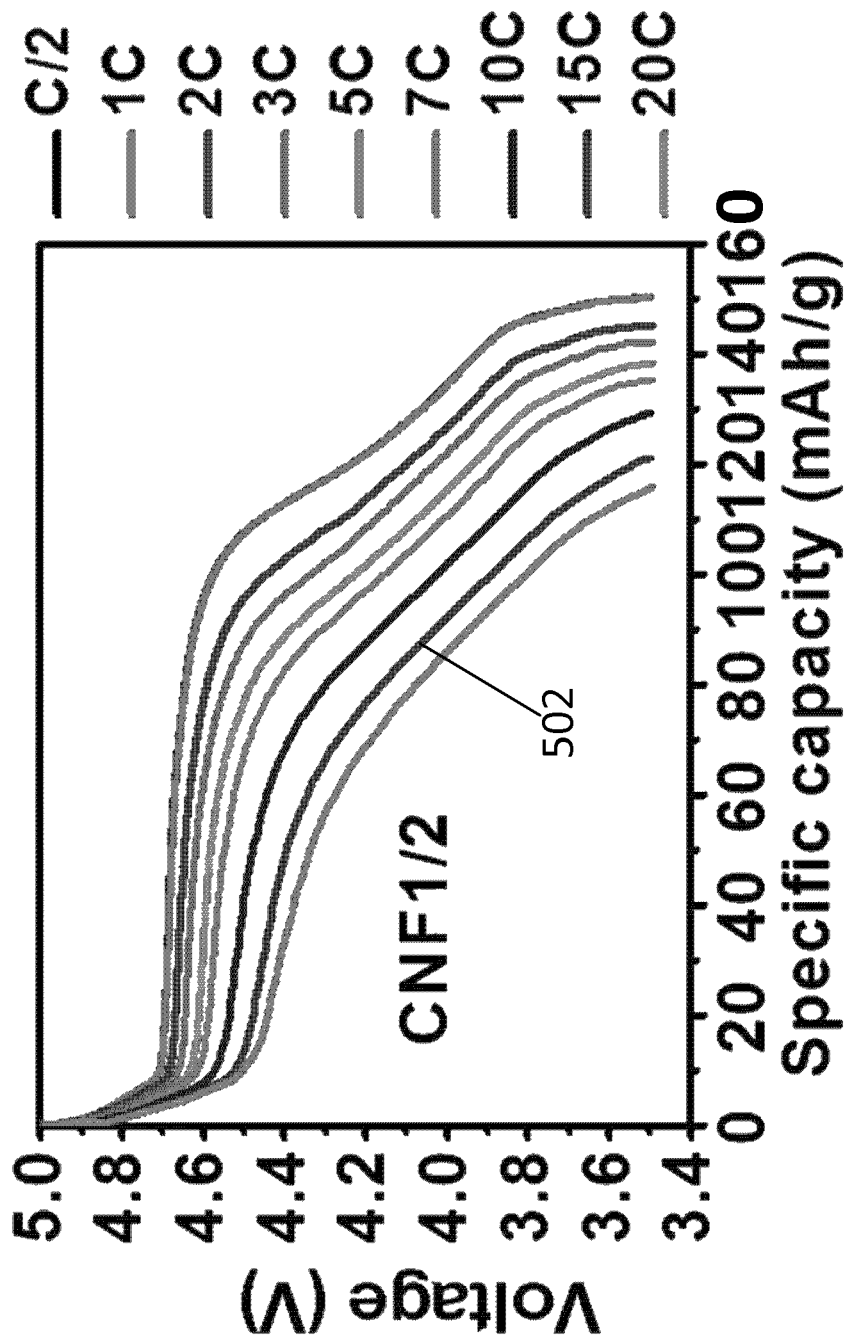
FIG. 5a shows discharge profiles of CNF1/2 network electrodes from C/2 to 20 C.
Figure 5B:
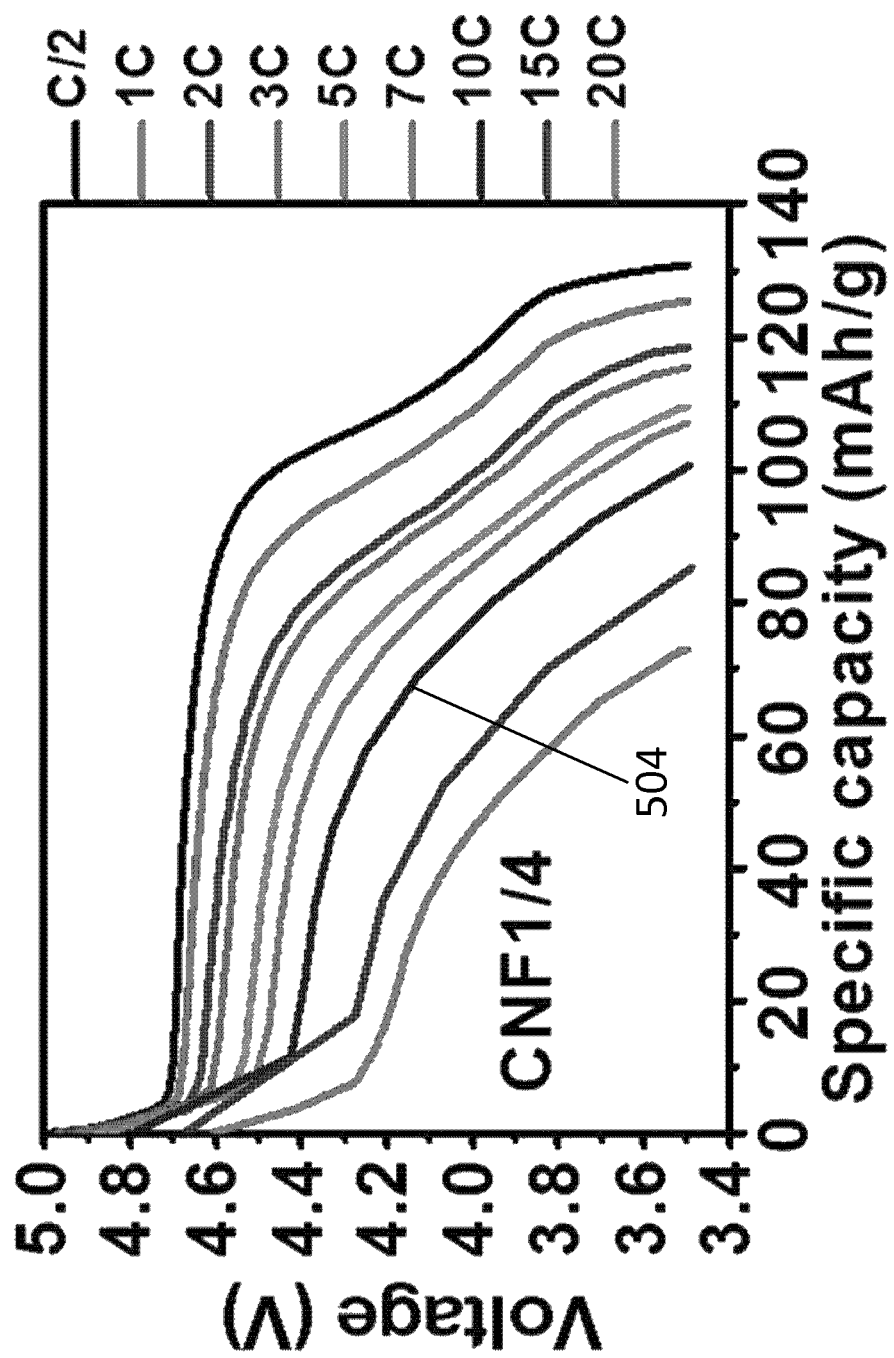
FIG. 5b shows discharge profiles of CNF1/4 network electrodes from C/2 to 20 C.
Figure 5C:
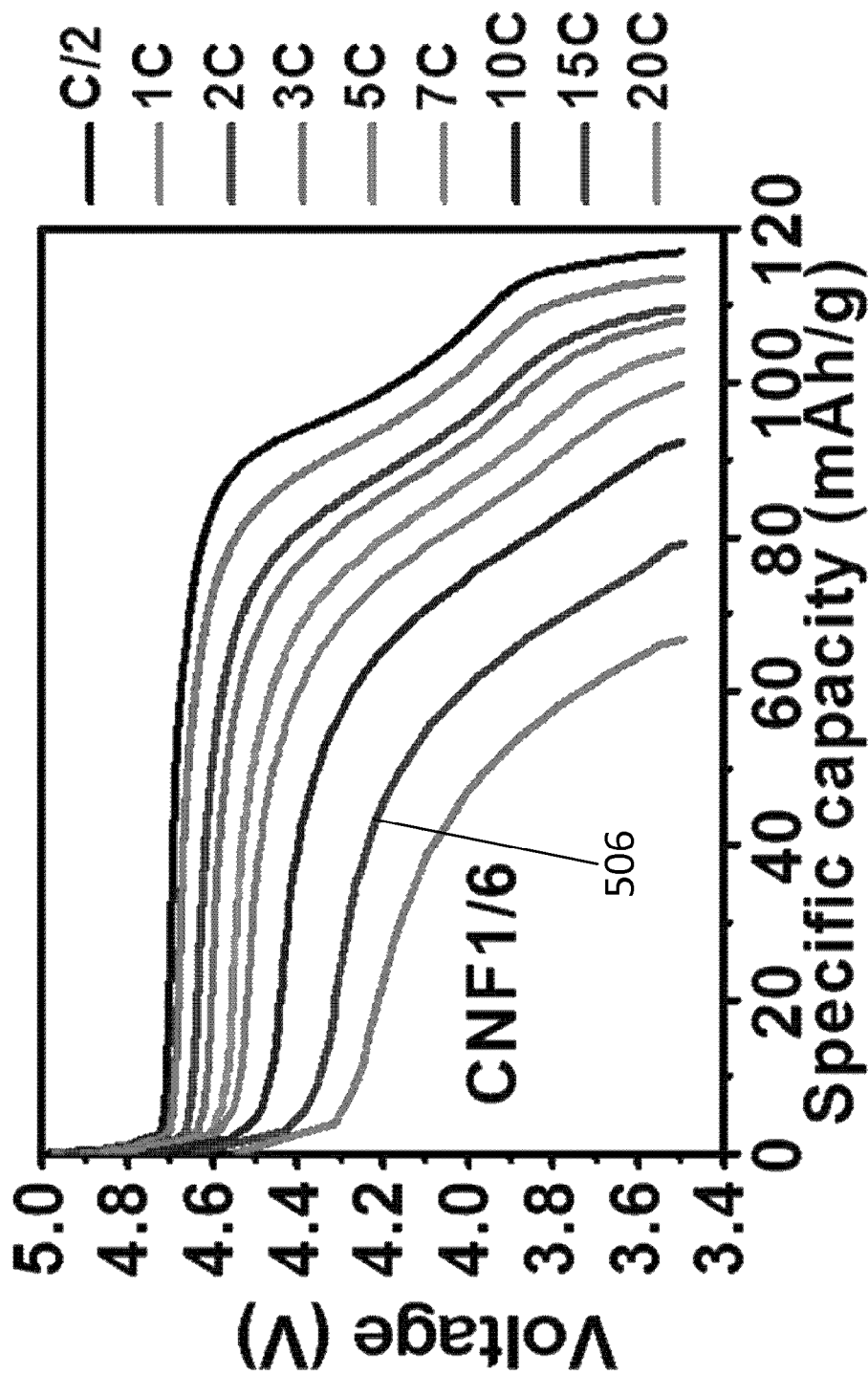
FIG. 5c shows discharge profiles of CNF1/6 network electrodes from C/2 to 20 C.
Figure 5D:
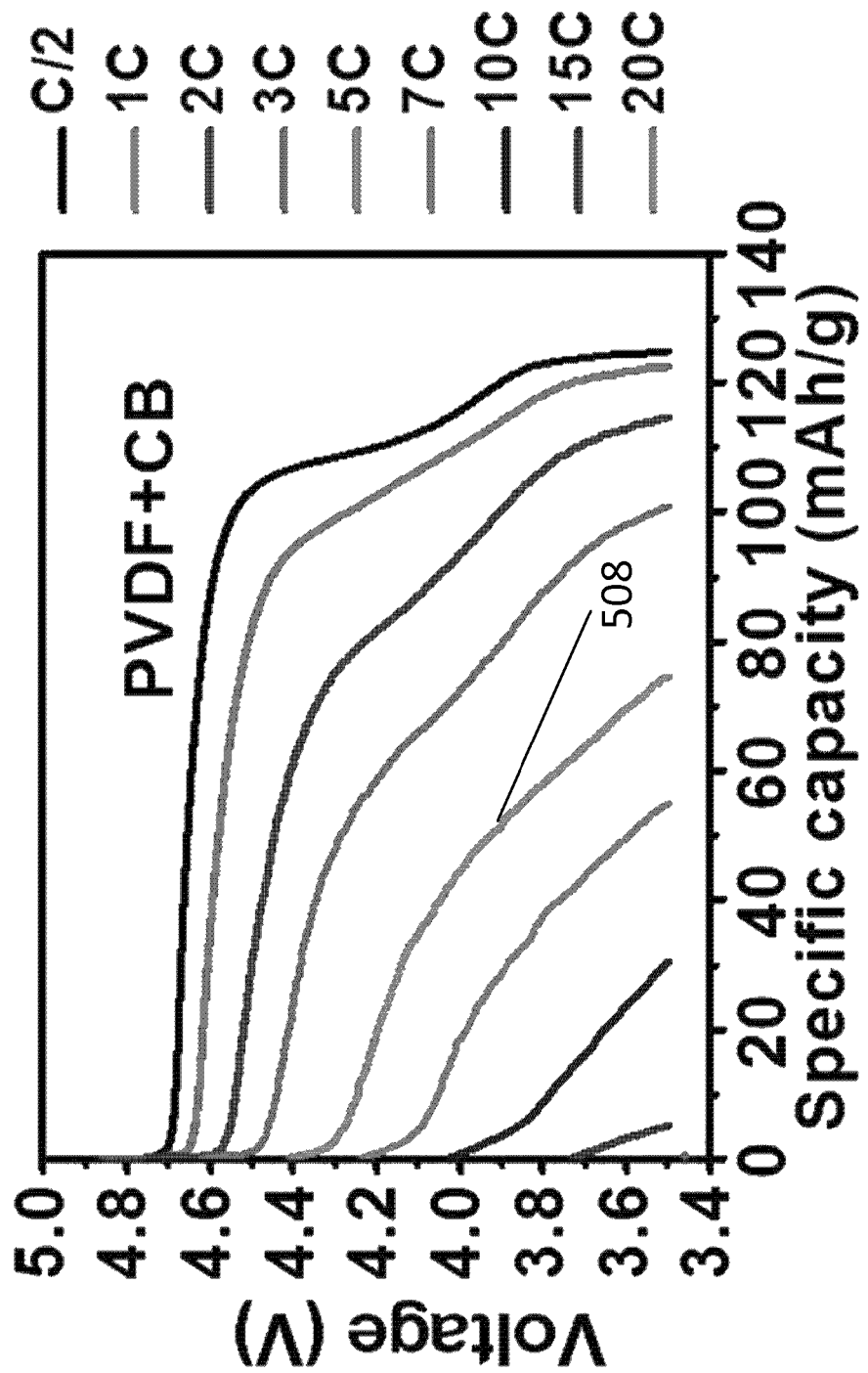
FIG. 5d shows discharge profiles of conventional electrodes from C/2 to 20 C.

The cyclability results in FIGS. 4c and 4d show that the free-standing $LiNi_{0.5}Mn_{1.5}O_4$/CNF network electrodes can sustain large current charge/discharge (as exemplified by specific capacity plots 416, 418, 420, for CNF1/2, CNF1/4, and CNF1/6, respectively, in FIG. 4c, and specific capacity plots 422, 424, 426 for CNF1/2, CNF1/4, and CNF1/5, respectively, in FIG. 4d, continuously without compromising cycle life. The charging rate for all the network electrodes is 3 C in FIG. 4c and 5 C in FIG. 4d. However, it is not meaningful to discuss the capacity of conventional electrodes since the high voltage plateau is not preserved in conventional electrodes. The data for PVDF+CB is truncated after ~45 cycles at 3 C due to failure of the electrode. The comparison here exemplifies the advantages of free-standing $LiNi_{0.5}Mn_{1.5}O_4$/CNF network electrodes in that not only is the total weight of the electrode reduced, but the current rate capability and retention rates are also enhanced, both of these factors leading to significant improvements on energy/power density of the batteries.

Polarization behavior may play an important role on the rate capability of the batteries. Rate capability is the ability for the batteries to undergo fast charging and discharging. To further study the effect from CNF network on the rate capability of the electrodes, polarization resistance $R_p$ was calculated based on methods presented in literature. The batteries were discharged at different current rates to obtain discharge profiles shown in FIGS. 5a-d. For example, voltage plot 502 shows the discharge of CNF1/2 at 15 C in FIG. 5a, voltage plot 504 shows the discharge of CNF1/4 at 10 C in FIG. 5b, and voltage plot 506 shows the discharge of CNF1/6 506 at 15 C shown in FIG. 5c. These plots demonstrate that the LMNO/CNF network electrodes maintained higher capacity and voltage than conventional electrodes at large current densities. Comparing with LMNO/CNF network electrodes, the conventional electrodes almost cannot deliver any capacity at high voltage range under current densities larger than 5 C, as shown by voltage plot 508 at 5 C in FIG. 5d.

The performance data of the electrodes displayed in FIGS. 5a-5d, and FIGS. 6a-6d can be further analyzed to determine their respective polarization resistance using methods outlined in "Understanding the Improvement in the Electrochemical Properties of Surface Modified 5 V $LiMn_{1.42}Ni_{0.42}Co_{0.16}O_4$ Spinel Cathodes in Lithium-Ion Cells," by Liu, J.; Manthiram, A., in Chem. Mater. 2009, 21, 1695-1707, and in "Toward Understanding of Electrical Limitations (Electronic, Ionic) in $LiMPO_4$ (M=Fe, Mn) Electrode Materials," by Delacourt, C.; Laffont, L.; Bouchet, R.; Wurm, C.; Leriche, J. B.; Morcrette, M.; Tarascon, J. M.; Masquelier, C., in. J. Electrochem. Soc. 2005, 152, A913-A921. Polarization resistance is defined as the slope of $E(I_m)=f(I_m)$, where E is the potential, $I_m$ is the mass current and $f(I_m)$ is the correlation between potential and mass current.

Figure 6A:
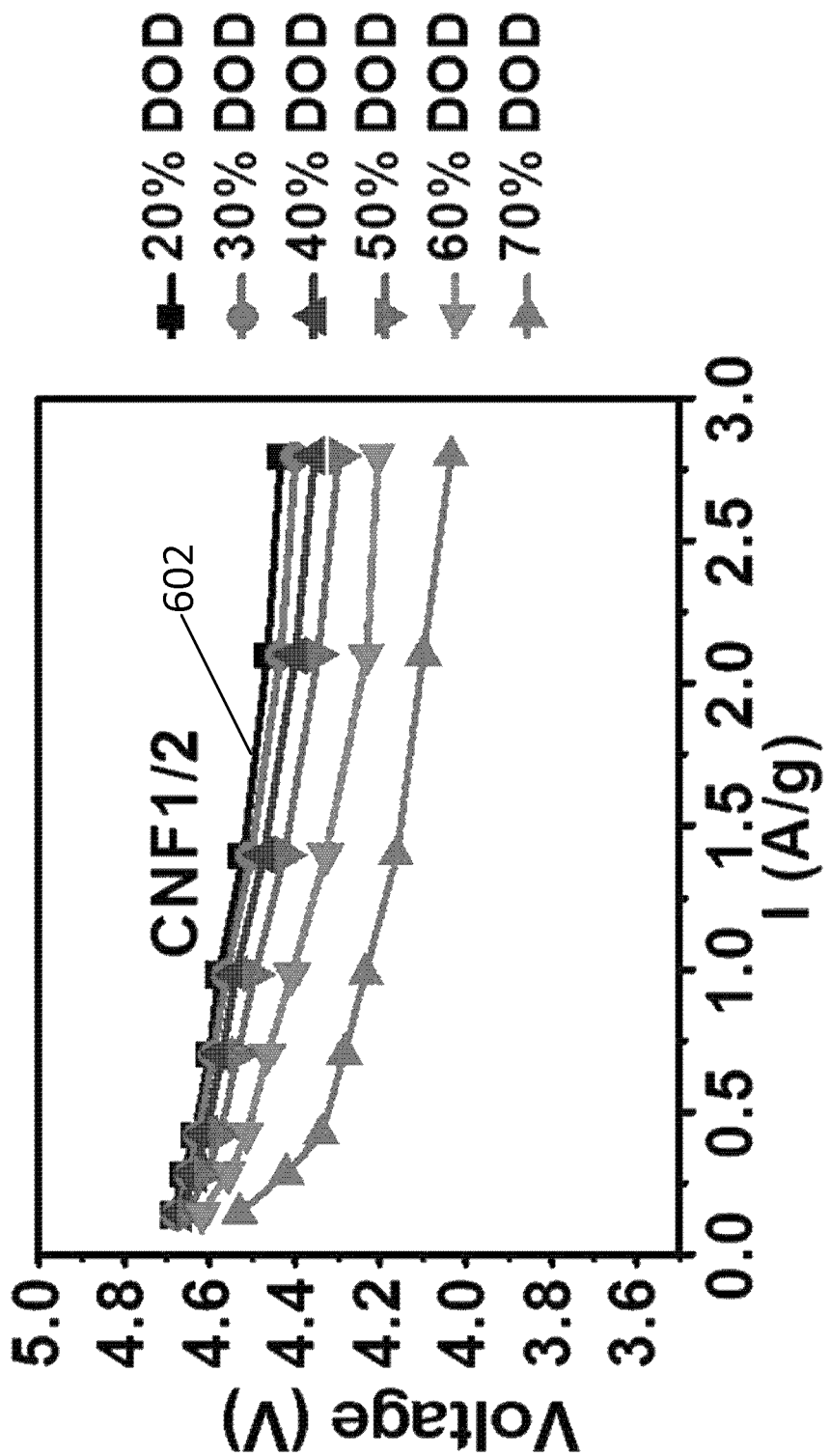
FIG. 6a shows voltage versus mass current profiles of CNF1/2 network electrode from 20% to 70% depth of discharge (DOD).
Figure 6B:
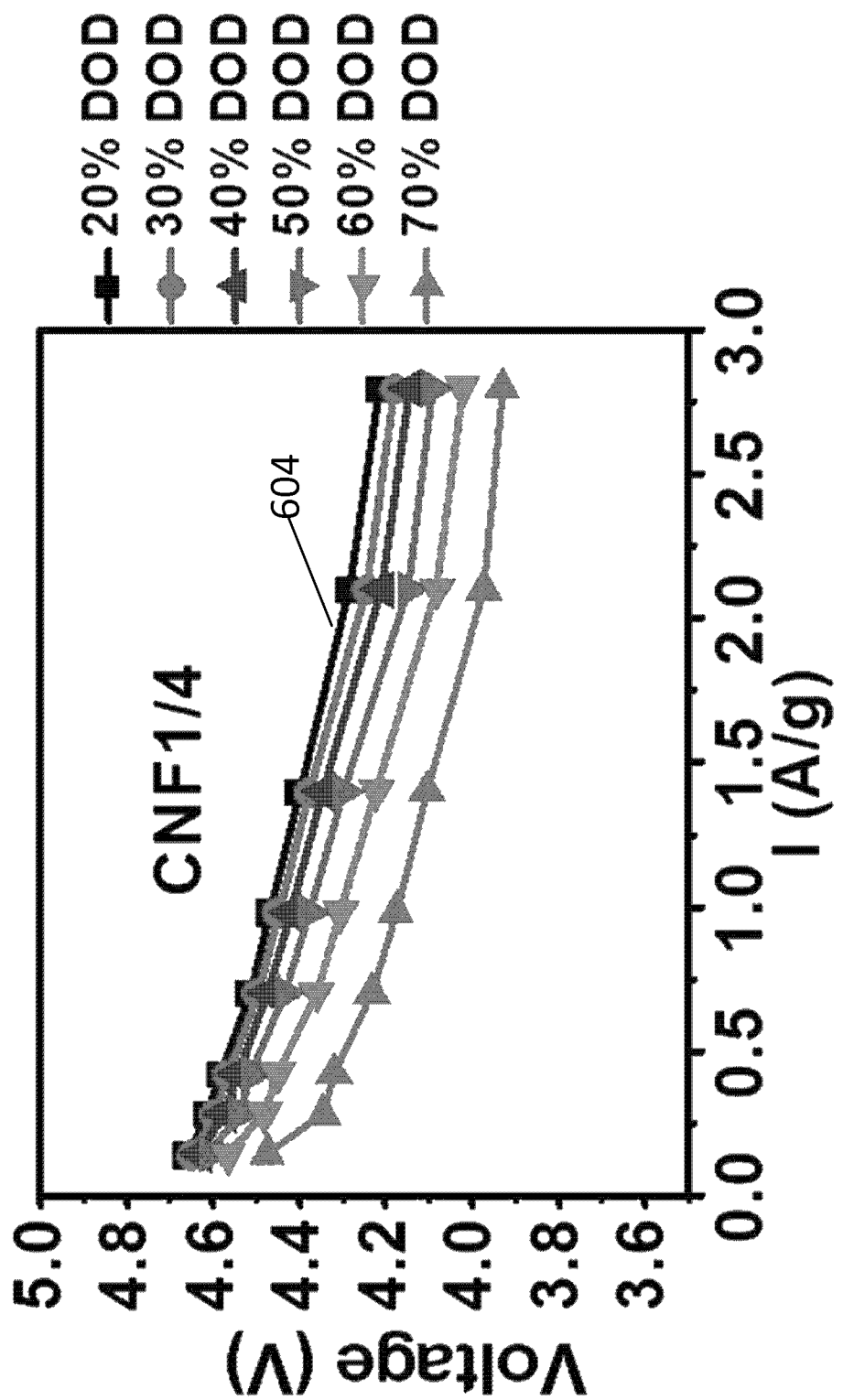
FIG. 6b shows voltage versus mass current profiles of CNF1/4 network electrodes from 20% to 70% DOD.
Figure 6C:
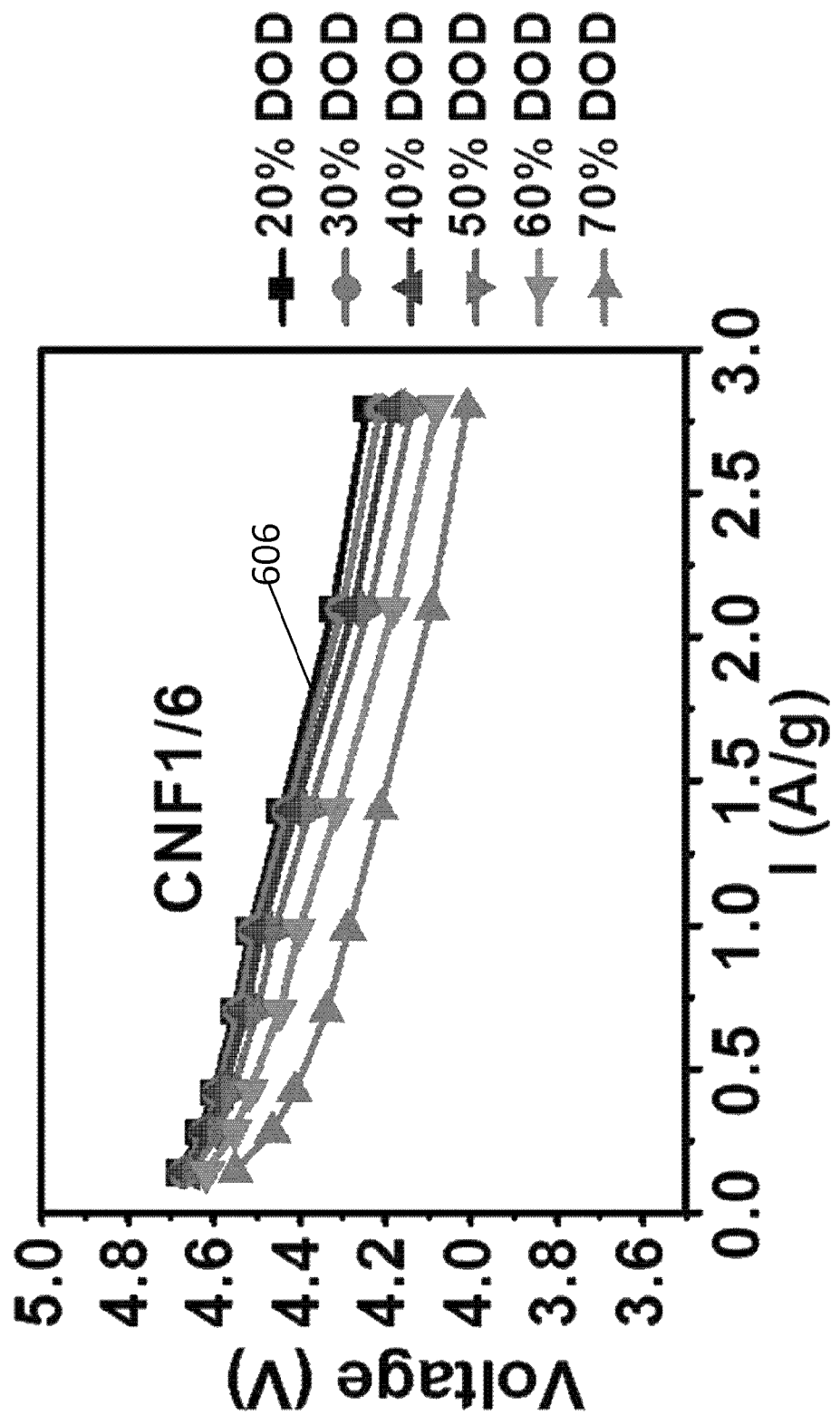
FIG. 6c shows voltage versus mass current profiles of CNF1/6 network electrodes from 20% to 70% DOD.
Figure 6D:
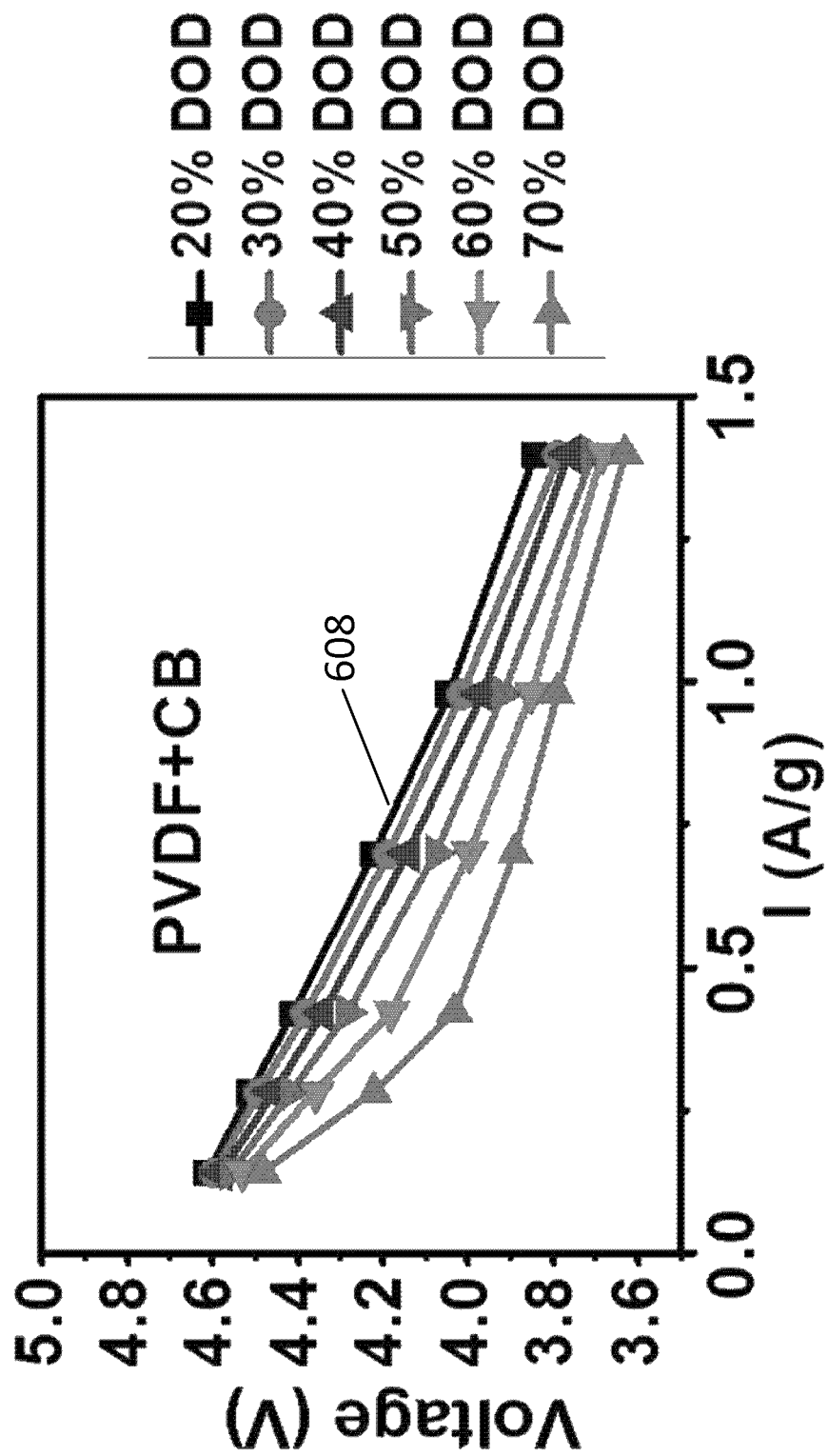
FIG. 6d shows voltage versus mass current profiles of conventional electrodes from 20% to 70% DOD.

Using the voltage curves obtained at different discharge rates (the data shown in FIGS. 5a-5d), voltage vs. mass current profile from different depth of discharge (DOD) can be obtained, as shown in FIG. 6a for CNF1/2, FIG. 6b for CNF1/4, FIG. 6c for CNF1/6 and FIG. 6d for conventional PVDF+CB. For example, the curve 602 in FIG. 6a was obtained by extracting the voltage values corresponding to 20% of DOD from curves in FIG. 5a with different current rates. Curves 604, 606, 608 in FIGS. 6b, 6c, and 6d are obtained by extracting the voltage values corresponding to 20% of DOD from the curves in FIGS. 5b, 5c, and 5d respectively. According to the relation $R_p=V/I$, polarization resistance $R_p$ can be extracted from the slope of voltage vs. mass current curves (of FIG. 6a). Linear fit for each of the curves in FIGS. 6a-6d allows $R_p$ values at different DOD to be obtained and plotted in FIG. 7.

$R_p$ values represent the polarization resistance of the whole battery instead of the cathode only. However, since the anode Li metal, separator, electrolyte and battery case are identical in all batteries, the difference in $R_p$ can be an index of the difference between free-standing $LiNi_{0.5}Mn_{1.5}O_4$/CNF network electrodes and conventional electrodes.

Figure 7:
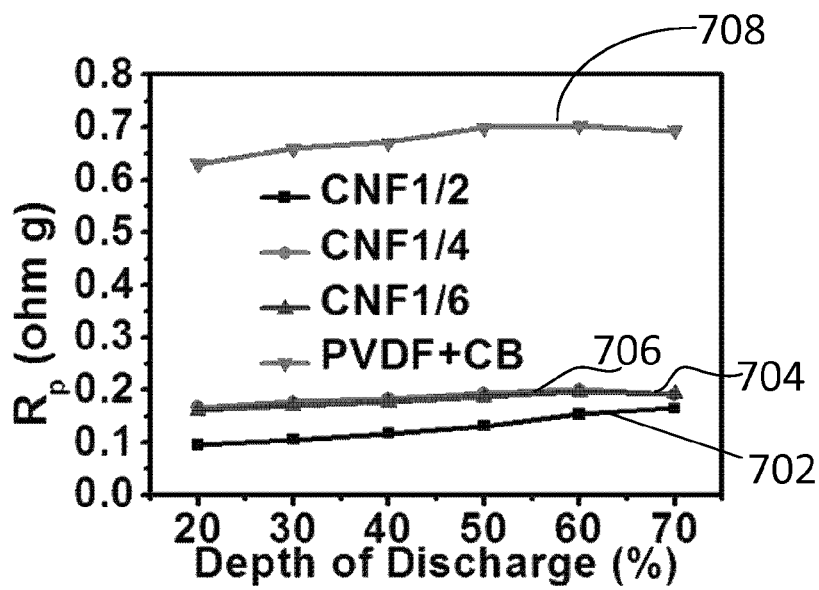
FIG. 7 shows a comparison of polarization resistance of batteries for various LNMO/CNF network electrodes and conventional electrodes as a function of DOD.

It is apparent from FIG. 7 that conventional electrodes have a much larger polarization resistance than the $LiNi_{0.5}Mn_{1.5}O_4$/CNF network electrodes. Among the $LiNi_{0.5}Mn_{1.5}O_4$/CNF network electrodes, CNF1/2 showed lowest $R_p$ values owing to the largest CNF content. The $R_p$ values from CNF1/4 and CNF1/6 are close to each other. The similarity of the $R_p$ values for CNF1/4 and CNF1/6 may be due to the small difference between CNF contents of 25% and 16.7% being not sufficiently significant to affect the high voltage plateau. In general, each redox couple will exhibit one voltage plateau. Based on the discharge profiles and the $R_p$ values, a decrease of CNF content from 25% to 16.7% does not appear to affect the energy/power delivered to a load (e.g., CPU, cell phone, electric vehicle) from the high voltage region. The region around and above 4.7 V is called the high voltage region.

The plots of $R_p$ as a function of DOD for CNF1/2, CNF1/4, CNF1/6 and conventional PVDF+CB are shown as 702, 704, 706, and 708, respectively in FIG. 7. All plots for $LiNi_{0.5}Mn_{1.5}O_4$/CNF network electrodes (702, 704, and 706) showed much smaller $R_p$ values than plot 708 for conventional electrodes, indicating the favorable conductivity enhancement from CNF network. In other words, polarization resistance decreases as the percentage weight of the CNF network increase, due to the conductivity enhancement from CNF network. Nevertheless, the charge transfer mechanism between CNF and $LiNi_{0.5}Mn_{1.5}O_4$ can readily be the subject of further research.

Figure 8:
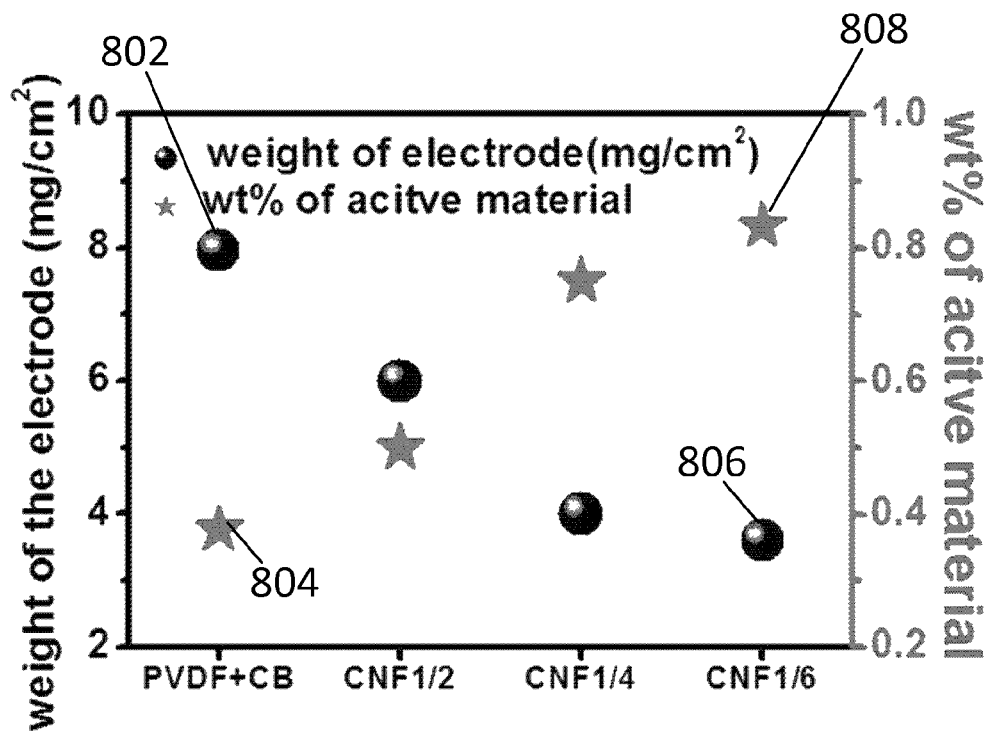
FIG. 8 shows a comparison of various LNMO/CNF network electrodes and a conventional electrode in terms of weight of the electrodes and weight percentage of active material in the electrodes.

FIG. 8 shows the total weight of the different electrodes as well as the active material weight percentage (wt %) in the respective electrodes when all electrodes have an active material loading of 3 $mg/cm^2$.

Compared with conventional electrodes (having a total weight 802 of about 8 $mg/cm^2$, and a weight percentage (wt %) 804 of about 0.4 wt %) the $LiNi_{0.5}Mn_{1.5}O_4$/CNF network electrodes can yield up to 55% reduction in total weight and 2.2 times enhancement in the wt % of active material in the whole electrode (e.g., CNF1/6 has a total weight 806 of about 3.7 mg/cm2, and a wt % 808 of about 0.85 wt %). Because the active material loading is constant for all electrodes (at 3 $mg/cm^2$), the total weight of the electrode across the LMNO/CNF network decreases as the percentage of CNF decreases. This is because the constant active material loading corresponds to a larger weight percentage of the active material within the network electrode. Since these properties strongly affect the gravimetric energy/power density of the batteries, the reduced weight and enhanced wt % of active material yield light-weight and high-power lithium ion batteries. Energy/power density is the energy/power provided per unit weight.

In addition to LNMO/CNF, free-standing LNMO/CNF network electrode can also function as high voltage cathode for lithium ion batteries. The design of the electrode structure can reduce the total weight of the electrode in addition to improving the working voltage of the electrode, thus resulting in a further enhancement of energy density. The higher the voltage is, the higher the energy density can be. The free-standing LNMO/CNF network electrodes showed excellent performance in fast charge/discharge cycling test, which demonstrated their capability in sustaining large current during battery operation. A fast charge can use a large current to charge a battery in a shorter period of time. Moreover, the remarkable current rate capability allows the free-standing LNMO/CNF network electrodes to be used in high power lithium ion batteries. The methods and systems disclosed herein allow highly scalable production of both $LiNi_{0.5}Mn_{1.5}O_4$ and CNFs, offering great potential to promote the development of light-weight and high-power lithium ion batteries for ultra-thin and ultra-light electronic devices and even electric vehicles in the future.

Figure 9A:
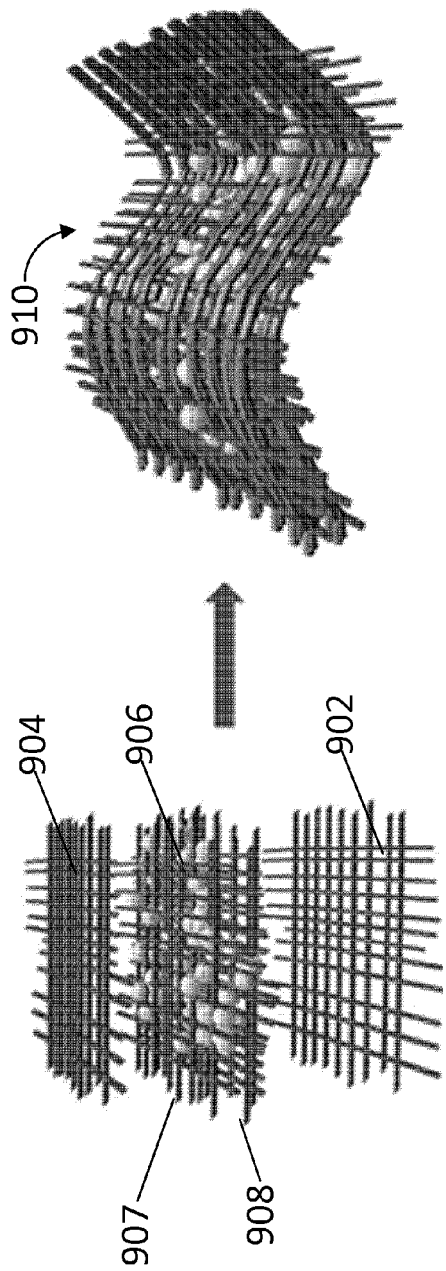
FIG. 9a is a schematic illustration of the fabrication process of the $LiNi_{0.5}Mn_{1.5}O_4$/MWCNT electrodes.

FIG. 9a illustrates the fabrication process and structure of LNMO/MWCNT electrodes 910. The MWCNTs and LNMO particles are dispersed in N-Methyl-2-pyrrolidone before vacuum filtration. A thin bottom layer of MWCNT film 902 is deposited by vacuum filtering before a $LiNi_{0.5}Mn_{1.5}O_4$/MWCNT mixture is filtered to form a layer 907 above the bottom layer 902 in which LNMO 906 is embedded in a MWCNT layer 908. Another thin layer of MWCNT film 904 is then formed by filtration on top of the LNMO/MWCNT network in layer 907. The MWCNT film 904 may be as thin as 1 μm. Both the top and bottom layers of LNMO/MWCNT layer 907 are covered by MWCNT films, so that the LNMO particles would not easily fall out from the electrode 910. The as-obtained LNMO/MWCNT electrodes can be easily peeled off from the filter paper. FIG. 9b depicts a LNMO/MWCNT electrode 912 that is flexible and robust and can be bent. The LNMO/MWCNT electrodes can also be cut into arbitrary shapes. The inset of FIG. 9b shows the flexibility of a test electrode 913 (after being cut into a 14 mm diameter piece). The electrode 913 can then be assembled into batteries.

The LNMO/MWCNT electrode 912 is made exclusively from LNMO particles and MWCNTs, without any binders, additives or substrates. LNMO is synthesized via a solid state reaction as described above. The MWCNTs are produced via fluidized bed catalytic chemical vapor deposition, and commercially available as FloTube 9000 from CNano, of San Francisco, Calif. These MWCNT can also be mass produced on the scale of 1000 tons. The scalable preparation methods described herein can allow LNMO/MWCNT electrodes to be produced on a large scale.

Figure 9C:
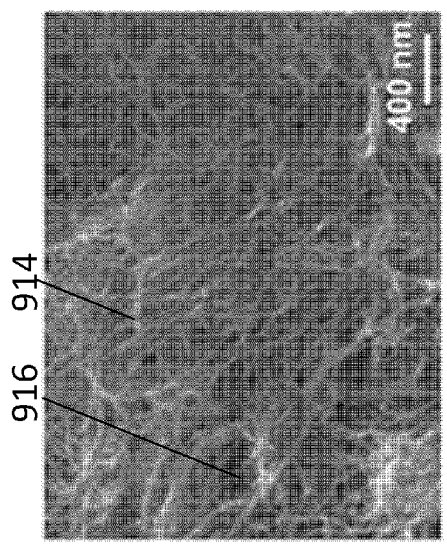
FIG. 9c is an SEM image of the MWCNT network on the surface of the LNMO/MWCNT electrodes.
Figure 9E:
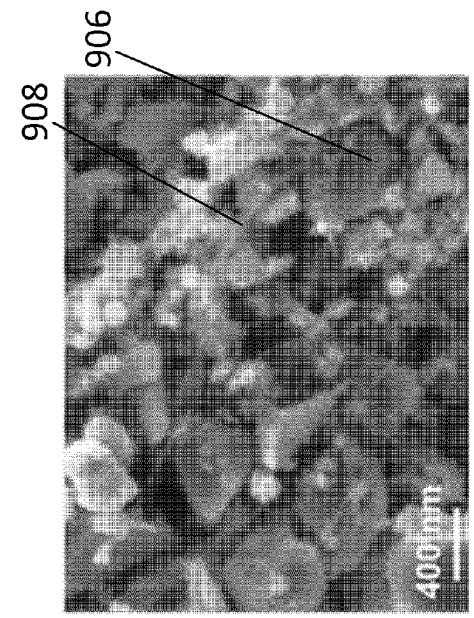
FIG. 9e is a high resolution SEM image showing the LNMO particles connected by MWCNTs in the LNMO/MWCNT electrodes.
Figure 9B:
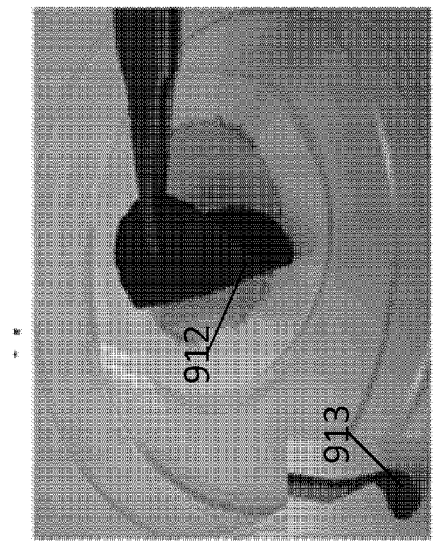
FIG. 9b is a photo of the $LiNi_{0.5}Mn_{1.5}O_4$/MWCNT network film.
Figure 9D:
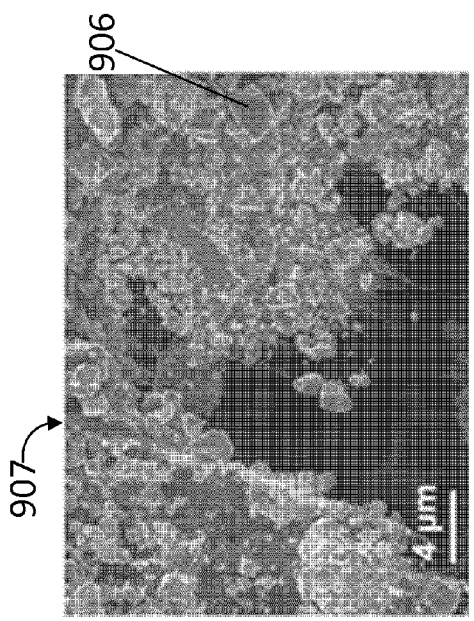
FIG. 9d is an SEM image of $LiNi_{0.5}Mn_{1.5}O_4$ particles dispersed in MWCNT network within the LNMO/MWCNT electrode.

FIG. 9c through 9e show SEM data from the characterization of the LNMO/MWCNT electrodes. FIG. 9c is an SEM image taken on a surface of the LNMO/MWCNT electrodes, which was covered by a thin layer of MWCNT film. MWCNTs can form a network structure 914 without large bundles (no significant aggregation). Voids 916 in the network can allow electrolyte to infiltrate into the electrodes, so the LNMO particles have sufficient access to Li ions during charge/discharge process.

Figure 9F:
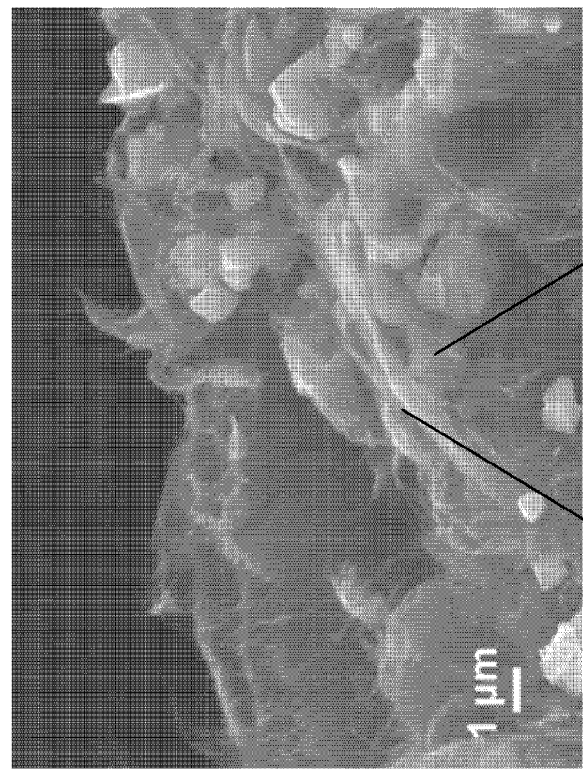
FIG. 9f is a SEM image taken at 45 degree tilt angle to show the cross section of LNMO/MWCNT electrodes.

FIG. 9d shows the layer 907 in an inner portion of the electrode 912, which contains the LMNO/MWCNT active material mixture layer, where the LNMO particles 906 are loaded in high density on the bottom MWCNT film. The active material layer 907 is a mixture of LNMO and MWCNT, and is not simply a collection of LNMO particles 906 deposited within two layers of MWCNT films. The LNMO particles 906 are connected by the MWCNTs 908 as shown in the high magnification SEM image of FIG. 9e. In this way the MWCNTs can provide efficient transport pathways for electrons inside the LNMO/MWCNT electrodes, allowing a current rate capability of the electrodes to be significantly enhanced. A cross section SEM image taken at 45 degree title angle to reveal the structure of the electrode is shown in FIG. 9f, where the fiber-like MWCNT 908 and LNMO particles 906 in the electrode are apparent.

Figure 10A:
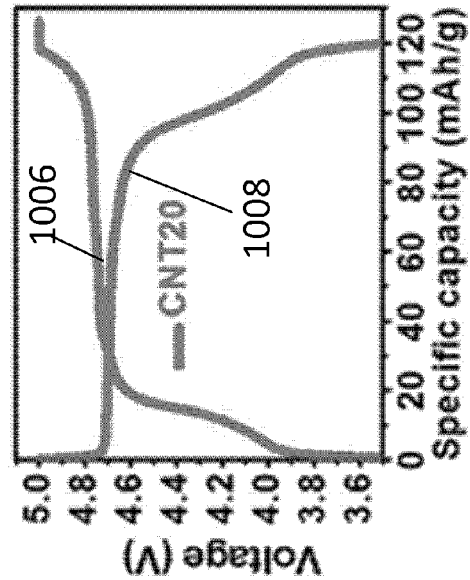
FIG. 10a shows charge/discharge curves of LNMO/MWCNT electrodes having 30% weight percentage of MWCNT (CNT30) and 20% weight percentage of MWCNT (CNT20), at C/2.
Figure 10B:
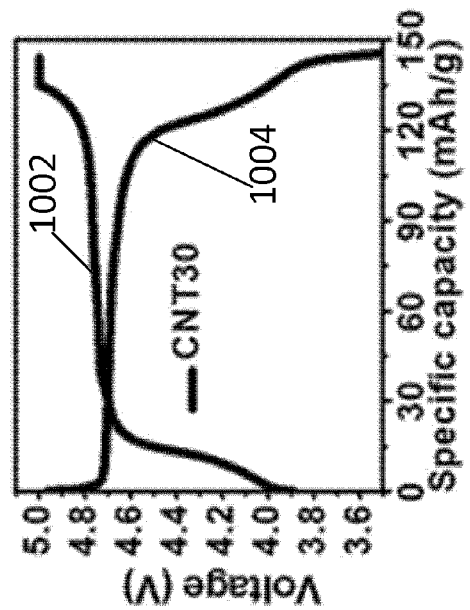
FIG. 10b shows charge/discharge curves of CNT20 samples at C/2.

LNMO/MWCNT electrodes having 30% weight percentage of MWCNT and 20% weight percentage of MWCNT, denoted by CNT30 and CNT20, respectively, are studied. The weight of MWCNTs includes the MWCNTs from the top and bottom layers 902 and 904. As a control, conventional electrodes were also tested and the weight ratio was LNMO:poly(vinylidene fluoride):carbon black=8:1:1. The charge curve 1002, discharge curves 1004 of CNT30 at C/2 and the charge curve 1006, and discharge curve 1008 of CNT20 at C/2 are presented in FIGS. 10a and 10b, respectively. The curves 1002, 1004, 1006, and 1008 show a typical high voltage plateau at 4.7 V, which is considerably higher than the traditional cathode materials such as $LiCoO_2$ (4.1 V) and $LiFePO_4$ (3.5 V). The small plateau at around 4.1 V reveals the existence of a small amount of $Mn^{3+}$ ions in the crystal, which is helpful for achieving structural reversibility of the electrodes during cycling.

Figure 10G:
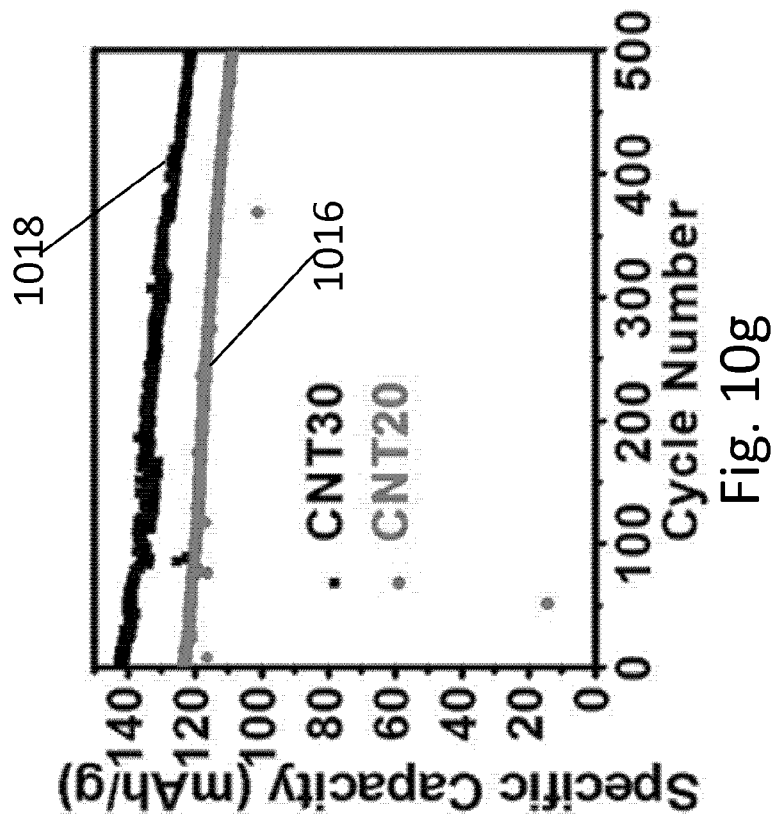
FIG. 10g shows the cycling performance of CNT30 and CNT20 up to 500 cycles at C/2

Cycling test results for both CNT30 and CNT20 at C/2 (1 C=140 mAh/g) are shown in FIG. 10c, together with results from conventional electrodes (i.e., PVDF+CB) as a control. After 100 cycles, the CNT30 samples can still deliver a high capacity 1010 of 135 mAh/g, and the CNT20 samples can deliver a high capacity 1012 of 120 mAh/g. However, the LNMO particles synthesized from the same batch but made into electrodes with conventional slurry-casting method, can only start with a capacity 1014 of 118 mAh/g and maintain 110 mAh/g after 100 cycles under the same testing condition. More cycling data for up to 500 cycles from the CNT30 sample (curve 1018) and the CNT20 sample (curve 1016) are shown in FIG. 10g, where around 87% of original capacity is retained after 500 cycles. Both CNT30 and CNT20 samples performed better than the conventional electrodes, which demonstrated that the LNMO/MWCNT electrode structure has indeed facilitated electron and Li ion transport, leading to a better utilization of the LNMO particles. In addition, issues relating to adhesion between binder and metal current collector are reduced (e.g., eliminated) in the new structure, further improving the performance of the batteries.

The capacity of CNT30 and CNT20 samples comes from LNMO particles only. The contribution from CNTs is subtracted in order to make a fair comparison with the control samples. Removing the contribution from CNTs, the LNMO/MWCNT electrodes can maintain 118 mAh/g capacity and 4.6 V voltage during 10 C charge/discharge. When the current density is increased to 20 C, the LNMO/MWCNT electrodes can still deliver over 80% of the capacity at 1 C. The high voltage, together with high capacity at large current density make LNMO/MWCNT electrodes particularly suited for high power lithium ion batteries.

The CNT30 and CNT20 samples are tested at different current rates up to a charge/discharge rate as high as 20 C. The results presented in FIG. 10d include comparisons with results from conventional electrodes. As shown by plots 1020 and 1022, the LNMO/MWCNT electrodes perform much better than the conventional electrodes (shown by plot 1024), especially at large current rates. At a charge/discharge rate of 20 C, the CNT30 and CNT20 samples can maintain a capacity of 107.9 mAh/g and 84.4 mAh/g, respectively, while capacity from the conventional electrodes decreased to almost zero. The capacity retention at each current rate (compared to the capacity at 1 C) was calculated and shown in FIG. 10e.

The conventional electrodes started to show an apparent loss in capacity 1030 when the current rate increased to 5 C. Further increases in the current rate cause a more severe drop in the capacity retention. However, the CNT30 and CNT20 samples still maintained 81% and 70% of the 1 C capacity (data plots 1026 and 1028) during charge/discharge at 20 C, respectively. The comparison of capacity retention at large current density shows clear superiority of the LNMO/MWCNT electrodes.

Between the CNT30 and CNT20 electrodes, the difference in capacity retention is not very apparent until the current density reaches 15 C. As a result, the conductivity from CNT20 samples should be sufficient for large current applications up to 10 C. The lower capacity from CNT20 samples may be due to the lower content of MWCNTs, such that some LNMO particles may not be in contact with CNTs and thus do not participate in the charge/discharge process.

Performance can be further improved for large scale applications by tuning and providing a more uniform dispersion of the LNMO/MWCNT mixture.

The polarization resistance $R_p$ of both LNMO/MWCNT electrodes and conventional electrodes is also investigated to elucidate the origins of the superior current performance of the LNMO/MWCNT electrodes. The batteries were discharged at different current densities and the voltage vs. capacity curves were collected and analyzed. The curves from C/2 to 7 C (1 C=140 mA/g) were selected because the lack of meaningful voltage plateau from the conventional electrodes was obtained for current rates larger than 7 C.

Figure 13A:
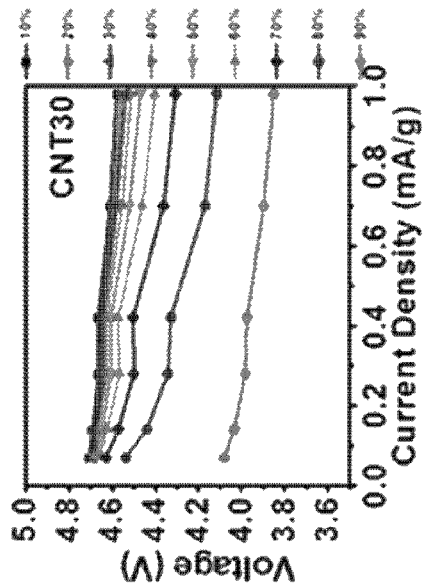
FIG. 13a is discharge profile of CNT30 at different current densities from C/2 to 7 C.
Figure 13B:
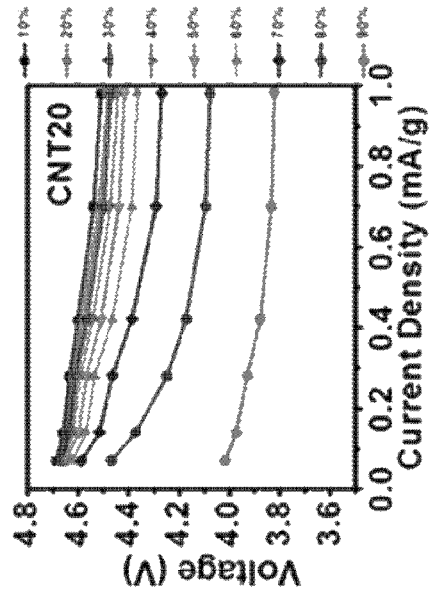
FIG. 13b is a voltage vs. current density profiles of CNT30 at different depth of discharge from 10% to 90%.
Figure 13C:
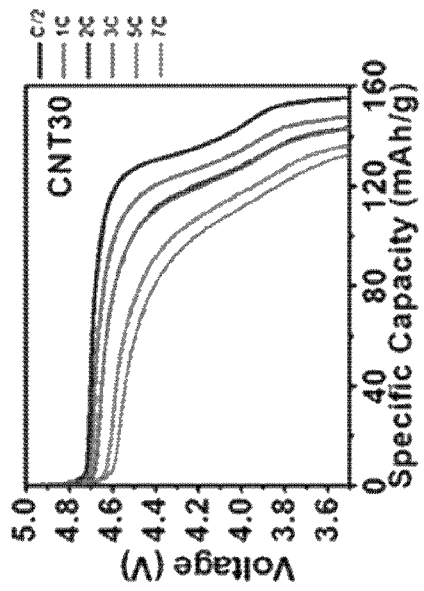
FIG. 13c is a discharge profile of CNT20 at different current densities from C/2 to 7 C.
Figure 13D:
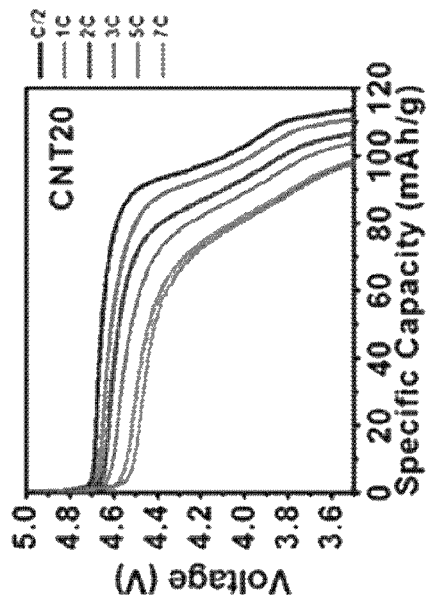
FIG. 13d is a voltage vs. current density profile of CNT20 at different depth of discharge from 10% to 90%.
Figure 13F:
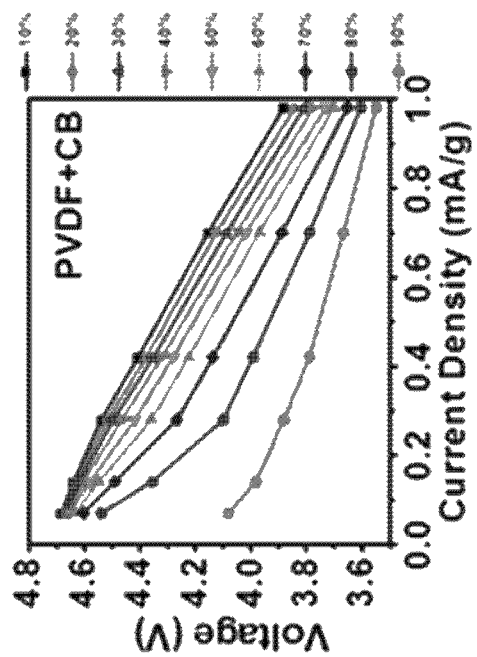
FIG. 13f is a voltage vs. current density profile for conventional electrodes at different depth of discharge from 10% to 90%.
Figure 13E:
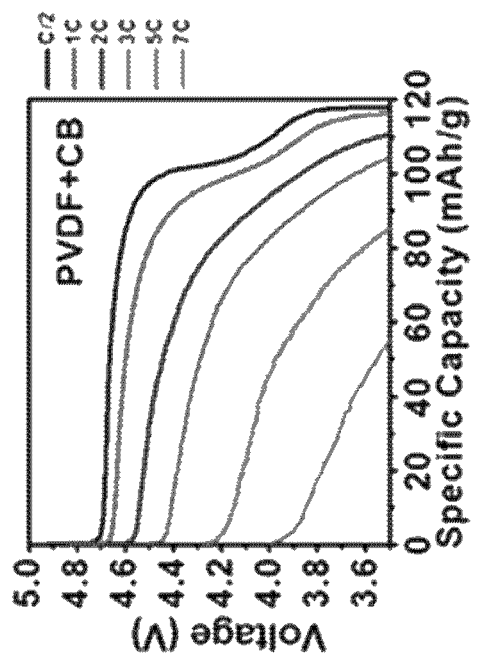
FIG. 13e is a discharge profile for conventional electrodes.

The $R_p$ values for CNT20, CNT30 and conventional electrodes are presented in FIG. 10f Briefly, the correlation between potential and mass current was extracted from three sets of voltage vs. capacity curves at different current densities (shown in FIGS. 13a, 13c, 13e). The $R_p$ values at different depth of discharge (DOD) were then obtained by doing linear fit of the potential vs. mass current relationship (shown in FIGS. 13b, 13d, 13f). The slope of the curves yields the Rp in unit of Ohm·g.

As shown in FIG. 10f, there is a significant reduction of polarization resistance $R_p$ in the LNMO/MWCNT electrodes, corresponding to plots 1032 and 1034, as compared with plot 1036 for conventional electrodes. Since the polymer binder is usually not conductive, replacing it with CNT network can effectively help to enhance the conductivity of the whole electrode. The reduced polarization resistance is a reason why the LNMO/MWCNT electrodes can maintain the high voltage plateau and high capacity at large current densities.

Figure 11B:
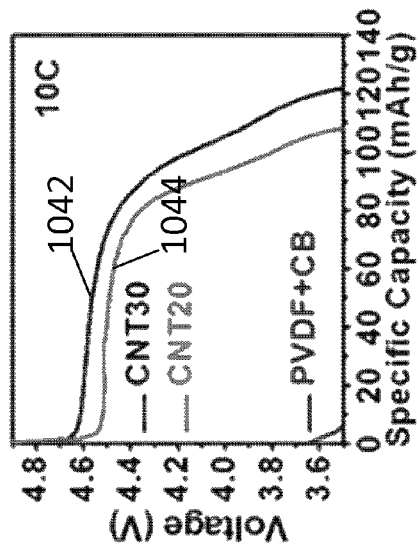
FIG. 11b shows discharge curves of CNT30, CNT20 and conventional electrodes at 10 C.

The LNMO/MWCNT electrodes at 5 C and 10 C charge/discharge for 100 cycles continuously to determine their cycling stability under large current charge/discharge processes. The voltage plateau 1038, 1040, 1042, and 1044 are shown in FIGS. 11a and 11b. The CNT30 and CNT20 samples maintain the high voltage plateau better than the conventional electrodes. At 5 C, the CNT30 and CNT20 samples can provide a voltage plateau at 4.60V and 4.58V, respectively. However, the conventional electrodes can only offer around 4.1V due to the large polarization. The voltage drop became more apparent when the current density increased to 10 C. The high voltage plateau of CNT30 and CNT20 samples remained at 4.58V and 4.51V, respectively, while the conventional electrode cannot even maintain a plateau.

Figure 11D:
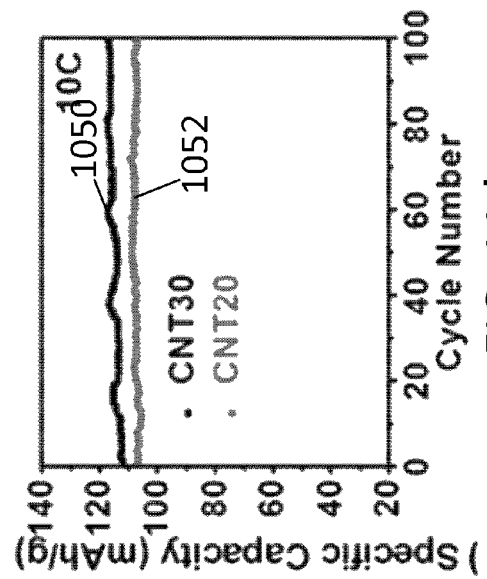
FIG. 11d shows specific capacity vs. cycle number over 100 cycles for CNT30 and CNT20 samples at 10 C.
Figure 11A:
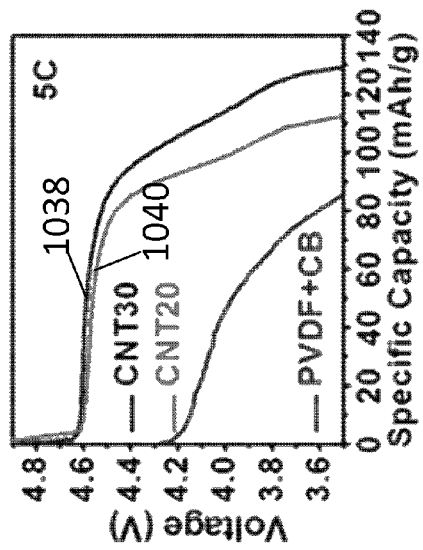
FIG. 11a shows discharge curves of CNT30, CNT20 and conventional electrodes at 5 C.
Figure 11C:
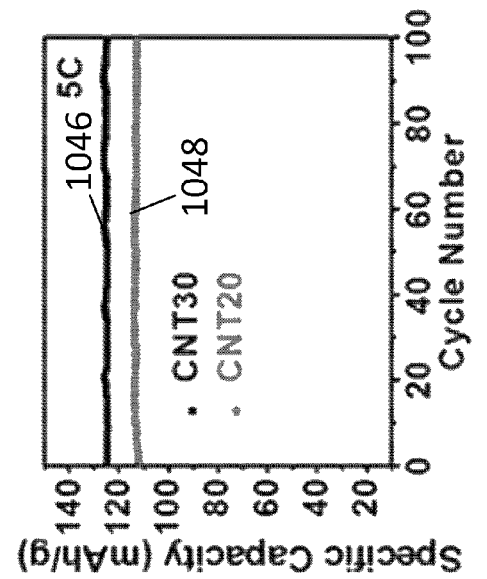
FIG. 11c shows specific capacity vs. cycle number over 100 cycles for CNT30 and CNT20 samples at 5 C.

Continuous cycling performance is presented in FIGS. 11c and 11d. The stability of the LNMO/MWCNT electrodes under large current cycling test is evident. After 100 cycles, no apparent degradation is observed and a high capacity 1046 (for CNT30) and a high capacity 1048 (for CNT20) are still exhibited at 5 C, and a high capacity 1050 (for CNT30) and a high capacity 1052 (for CNT20) are still exhibited at 10 C. The voltage and capacity retention under large current and the excellent cycling stability from the LNMO/MWCNT electrodes remarkably outperform the conventional electrodes.

The increase in capacity 1050 from the CNT30 samples at 10 C can be due to the insufficient electrolyte infiltration into the CNT network at the earlier (beginning) cycles. The CNTs in the CNT30 samples should have a larger surface area compared to the CNT samples. Thus, CNT30 can absorb more electrolytes to fully wet its surface, and thus more time may be needed before the electrolyte is fully infiltrated within the electrode. As a result of the large current and fast lithiation, the limited amount of electrolyte around the surface of the particles may become depleted of Li ions, leading to insufficient lithiation. With prolonged cycling, the electrolyte can become fully infiltrated into the CNT network, and the capacity of the electrode can recover upon receiving sufficient supply of Li ions from the electrolyte.

In addition to the excellent capacity retention at large current rate, the LNMO/MWCNT electrodes are lightweight since the use of conductive additive, binder and current collector is eliminated. The total weight of an electrode is calculated in FIG. 11e, based on LNMO particles loading of 5 mg/cm$^2$. For example, the weight 1054 of CNT30 is less than 11 mg. The power density is calculated in FIG. 11f considering the voltage provided at 10 C and using the weight of the electrode. The power density 1056 offered by the CNT20 electrode is more than two times larger than that from conventional electrodes.

As the power density may be compromised when other components in the batteries are taken into consideration, only comparisons between different electrodes (instead of absolute numbers) are discussed. In addition to the voltage and capacity retention of the LNMO/MWCNT electrodes, their highly stable cycling performance makes them well-suited for use in high power batteries. The use of these LNMO/MWCNT electrodes can also reduce the weight of these batteries, providing a significant advantageous feature in battery design.

Pouch cells were assembled to test the self-discharge property of the LNMO/MWCNT film in a bended state. The Cu foil connected to one end of a Ni tab was used as back contact for anode, and the Al foil connected to one end of the Al tab was used as back contact for cathode. The Ni tab can be connected to the current collector and used as a negative terminal. The Al tab can be used as the positive terminal. The middle part of the tabs was covered with a thermal tape which was used to seal the pouch cell upon heating. The LNMO/MWCNT film was put between the Al foil and the separator without using binder, to test the mechanical and electrochemical stability of the film during bending. A very thin Li film was put between the separator and the Cu foil to act as anode. The outer ends of the tabs were connected to test channels with wires, and the test method was the same as testing coin cells, except that the pouch cells were tested in a bended state.

Figure 12A:
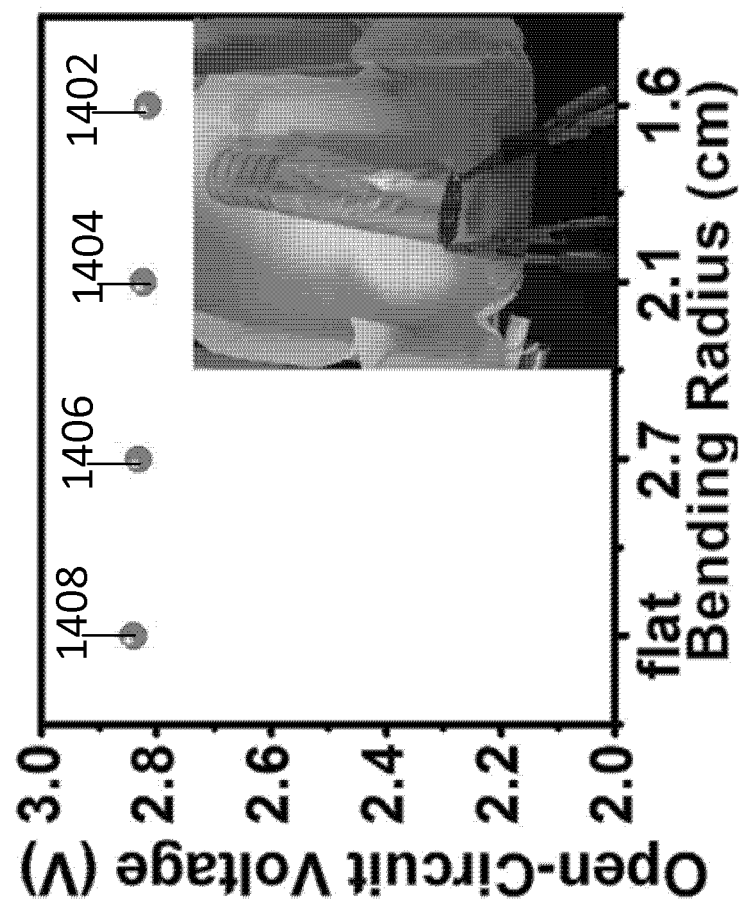
FIG. 12a shows open circuit voltage of the $LiNi_{0.5}Mn_{1.5}O_4$/MWCNT electrodes at different bending radius.

The flexibility of LNMO/MWCNT electrodes allow pouch cells to be assembled and bent to different radii. The open circuit voltage (OCV) at different bending radius is shown in FIG. 12a. The inset picture illustrates the testing conditions where the batteries were attached to cylinders with different diameters to keep the bending radius. The test was kept for 10 hours at each bending radius to inspect the voltage decay and self-discharge ratio. The details of the test results are shown in FIGS. 14a-d. OCV was tested for pouch cells at different bending radius together with testing in flat state as a control. The voltage profiles are shown in FIGS. 14a-d. The pouch cells were wrapped around cylinders having different diameters and taped to fix the radius during the test. Each pouch cell was tested for 10 hours to investigate the self-discharge during that time. The recorded OCV demonstrates the stability of the LNMO/MWCNT electrodes in a bended state.

Comparing with the flat state OCV 1408 (in FIG. 14d), the OCV 1402 shown at FIG. 14a at 1.6 cm bending radius is only 0.026 V lower, which is within a reasonable fluctuation range. The OCV 1404 shown in FIG. 14b is obtained from a bending radius of 2.1 cm and the OCV 1406 shown in FIG. 14c is obtained from a bending radius of 2.7 cm. The stable voltage at bent state exhibits favorable energy storage property to be a potential flexible power source for electronic devices.

FIGS. 12b and 12c show the flexible battery 1220 being used to power a blue light emitting diode (LED) 1222, which requires more energy than red LEDs. The LNMO/MWCNT flexible electrodes are well suited for high-power, flexible, and yet light-weight batteries. FIGS. 12b and 12c show the flexible battery 1220 functionally well enough to power the LED 1222 despite being bent in two different ways.

The LNMO/MWCNT network electrode combines the advantages from both material optimization and electrode structure design. In addition to the high voltage provided by LNMO, the MWCNTs can provide a highly conductive and yet light-weight network, which is also free-standing and flexible. While facilitating the electron transport in the electrodes, the porous MWCNT network can also facilitate electrolyte infiltration, and thus the LNMO particles can access both electrons and Li ions effectively. With the advantages from both high voltage cathode material LNMO and conductive MWCNT network structure, the LNMO/MWCNT electrodes can deliver over 80% capacity at up to 20 C current rate. After 100 cycles at 10 C charge/discharge, the high voltage plateau is still maintained and no apparent capacity decay is observed. During the high current rate cycling test, no apparent capacity decay is observed after 100 cycles at 10 C. Calculation of the polarization resistance $R_p$ reveals that the $R_p$ of the LNMO/multiwall carbon nanotubes electrodes is less than 25% of that of the conventional electrodes fabricated through slurry-casting on metal current collector. In addition, the power density calculated from LNMO/MWCNT is over two times larger than that provided by the conventional electrodes. The combined effect from high voltage, high current rate performance and reduced weight makes LNMO/MWCNT electrodes a promising candidate for high-power lithium ion batteries. Moreover, the features of flexibility and light-weight also demonstrate the potential of applying the LNMO/MWCNT electrodes in new-generation flexible or ultrathin/ultralight electronic devices in the future.

Since the total weight is also reduced, the power density of the LNMO/MWCNT electrodes is evidently enhanced comparing with conventional electrodes. The combined effect from high voltage, high conductivity, light weight and flexibility render the $LiNi_{0.5}Mn_{1.5}O_4$/MWCNT electrodes promising candidate to work in high power batteries for new-generation ultralight/ultrathin and flexible devices.

Further modifications and alternative embodiments of various aspects will be apparent to those skilled in the art in view of this description. Accordingly, this description is to be construed as illustrative only. It is to be understood that the forms shown and described herein are to be taken as examples of embodiments. Elements and materials may be substituted for those illustrated and described herein, parts and processes may be reversed, and certain features may be utilized independently, all as would be apparent to one skilled in the art after having the benefit of this description. Changes may be made in the elements described herein without departing from the spirit and scope as described in the following claims.

What is claimed is:

1. An electrode, comprising:
   a first carbon network;
   a layer deposited above the first carbon network, the layer including an active material; and
   a second carbon network covering the layer, wherein the first and second carbon networks are a binder, a conductive additive and a current collector to the electrode.

2. The electrode of claim 1, wherein the active material comprises $LiNi_{0.5}Mn_{1.5}O_4$, and the first and second carbon networks are continuous and porous.

3. The electrode of claim 2, wherein the first and second carbon networks comprise carbon nanofibers.

4. The electrode of claim 3, wherein the layer comprises carbon nanofibers into which $LiNi_{0.5}Mn_{1.5}O_4$ is embedded, particles of $LiNi_{0.5}Mn_{1.5}O_4$ are connected by the carbon nanofibers, and the electrode consists of carbon nanofibers and $LiNi_{0.5}Mn_{1.5}O_4$.

5. The electrode of claim 4, wherein the carbon nanofibers in the layer are a binder, a conductive additive and a current collector to the electrode.

6. The electrode of claim 2, wherein the first and second carbon networks comprise carbon nanotubes, and the electrode is flexible.

7. The electrode of claim 1, wherein the electrode provides a specific capacity of not less than 65 mAh/g at a current rate of 20 C.

8. The electrode of claim 1, wherein a polarization resistance of the electrode is less than 0.2 ohm/g.

9. The electrode of claim 1, wherein a weight percentage of the active material to the weight of the electrode is at least 0.45%.

10. The electrode of claim 1, wherein the electrode is configured to deliver a capacity of more than 110 mAh/g after 100 charging and discharging at 5 C.

11. A lithium-ion battery comprising the electrode of claim 1.

12. A method of forming an electrode, the method comprising:
    depositing a carbon material using a first solution comprising the carbon material to obtain a first layer of a carbon network;
    depositing a active material and the carbon material using a solution mixture to form a composite film above the first layer of the carbon network, and
    depositing the carbon material using a second solution of the carbon material to obtain a second layer of the carbon network above the composite film, wherein the first layer of the carbon network, the second layer of the carbon network are a binder, a conductive additive and a current collector to the electrode.

13. The method of claim 12, wherein the carbon network comprises a carbon nanomaterial.

14. The method of claim 13, wherein the carbon nanomaterial comprises carbon nanofibers.

15. The method of claim 13, wherein the carbon nanomaterial comprises carbon nanotubes.

16. The method of claim 12, wherein the active material comprises $LiNi_{0.5}Mn_{1.5}O_4$.

17. A lithium-ion battery having a flexible electrode formed using the method of claim 15.

18. A lithium-ion battery formed using the method of claim 16, wherein the electrode provides a specific capacity of not less than 65 mAh/g at a current rate of 20 C.

19. A lithium-ion battery formed using the method of claim 16, wherein the electrode is configured to deliver a capacity of more than 110 mAh/g after 100 charging and discharging at 5 C.

20. A lithium-ion battery formed using the method of claim 16, wherein a weight percentage of the active material to the weight of the electrode is at least 0.45%.

21. A lithium-ion battery comprising an anode and a cathode, wherein the anode comprises:
a first carbon network;
a layer deposited above the first carbon network, the layer including an active material; and
a second carbon network covering the layer, the first and second carbon networks are a binder, a conductive additive and a current collector to the anode, and wherein the cathode comprises:
a third carbon network;
a second layer deposited above the third carbon network, the second layer including the active material; and
a fourth carbon network covering the second layer, the third and fourth carbon networks are a binder, a conductive additive and a current collector to the cathode.

* * * * *